US011586486B2

(12) United States Patent
Jha et al.

(10) Patent No.: US 11,586,486 B2
(45) Date of Patent: Feb. 21, 2023

(54) METHODS AND SYSTEMS THAT EFFICIENTLY CACHE LOG/EVENT MESSAGES IN A DISTRIBUTED LOG-ANALYTICS SYSTEM

(71) Applicant: VMWARE, INC., Palo Alto, CA (US)

(72) Inventors: Ritesh Jha, Bangalore (IN); Jobin Raju George, Bangalore (IN); Shivam Satija, Bangalore (IN); Nikhil Jaiswal, Bangalore (IN); Pushkar Patil, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 281 days.

(21) Appl. No.: 17/093,569

(22) Filed: Nov. 9, 2020

(65) Prior Publication Data

US 2022/0058068 A1 Feb. 24, 2022

(30) Foreign Application Priority Data

Aug. 24, 2020 (IN) .............................. 202041036438

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 41/069* | (2022.01) | |
| *G06F 11/34* | (2006.01) | |

(52) U.S. Cl.
CPC .............. *G06F 9/546* (2013.01); *G06F 9/542* (2013.01); *G06F 11/3476* (2013.01); *H04L 41/069* (2013.01)

(58) Field of Classification Search
CPC ...... G06F 9/546; G06F 9/542; G06F 11/3467; H04L 41/069
USPC ......................................................... 709/201
See application file for complete search history.

(56) References Cited

U.S. PATENT DOCUMENTS

| | | | | |
|---|---|---|---|---|
| 8,990,378 | B2 * | 3/2015 | Caner ................ | H04L 41/0631 |
| | | | | 709/224 |
| 10,205,627 | B2 * | 2/2019 | Kushmerick ......... | H04L 67/131 |
| 10,691,728 | B1 * | 6/2020 | Masson ................ | H04L 43/06 |
| 2009/0013007 | A1 * | 1/2009 | Caner .................. | H04L 43/04 |

(Continued)

*Primary Examiner* — Hamza N Algibhah

(57) ABSTRACT

The current document is directed to methods and systems that efficiently cache log/event messages in log/event-message systems incorporated within distributed computer facilities. The log/event-message systems provide the data-collection, data-storage, and data-querying functionalities that provide a basis for distributed log-analytics systems which, in turn, provide a basis for automated and semi-automated system-administration-and-management systems. Efficient caching significantly extends the period of time that networking failures and log/event-message processing delays can be tolerated by log/event-message systems without significant loss of information. Rather than caching individual log/event messages, message collectors that employ the currently disclosed technologies cache information regarding log/event-message types, leading to efficient compression of the cached information. As a result, message collectors can cache log/event messages without significant loss of information for time periods of several orders of magnitude greater than those achieved by caching individual log/event messages.

20 Claims, 46 Drawing Sheets

(56) References Cited

U.S. PATENT DOCUMENTS

| | | | | |
|---|---|---|---|---|
| 2012/0005542 A1* | 1/2012 | Petersen | ............ | H04L 63/1425 |
| | | | | 714/48 |
| 2015/0220605 A1* | 8/2015 | Syed | ...................... | G06F 17/40 |
| | | | | 707/776 |
| 2016/0292592 A1* | 10/2016 | Patthak | ............... | G06F 16/2228 |
| 2017/0149793 A1* | 5/2017 | Spertus | ................ | H04L 63/105 |
| 2017/0357710 A1* | 12/2017 | Shtossel | ............. | G06F 16/2455 |
| 2018/0046455 A1* | 2/2018 | Walsh | ..................... | G06F 16/22 |
| 2018/0046697 A1* | 2/2018 | Maciolek | ............ | G06F 16/2452 |
| 2021/0334312 A1* | 10/2021 | Neo | ...................... | G06F 16/258 |
| 2021/0334386 A1* | 10/2021 | AlGhamdi | ............... | G06N 5/04 |
| 2021/0357397 A1* | 11/2021 | Jha | ...................... | G06F 9/45558 |
| 2022/0121507 A1* | 4/2022 | Jha | ......................... | G06F 9/546 |
| 2022/0158889 A1* | 5/2022 | Jha | ..................... | H04L 41/0686 |
| 2022/0318202 A1* | 10/2022 | Jha | ..................... | G06F 16/1734 |

* cited by examiner

FIG. 11

| Timestamp | Data Center | Host | Level | Description |
|---|---|---|---|---|
| 20-08-22T 12:10:51 | SEA/WA 1 | H361 | 10 | Transaction_1 |
| 20-08-22T 12:10:51 | CHI/IL 3 | H722 | 9 | T-Denial |
| 20-08-22T 12:10:51 | NYC/NY 16 | H166 | 10 | Transaction_3 |
| 20-08-22T 12:10:52 | SFR/CA 6 | H077 | 9 | T-Denial |
| 20-08-22T 12:10:52 | DEN/CO 2 | H216 | 9 | T-Denial |
| 20-08-22T 12:10:53 | SEA/WA 2 | H603 | 8 | Transaction Failure |
| 20-08-22T 12:10:53 | LAN/CA 10 | H501 | 1 | Server Down |
| 20-08-22T 12:10:54 | ATL/GA 2 | H018 | 7 | App Restart |
| 20-08-22T 12:10:54 | CHI/IL 3 | H166 | 9 | T-Denial |
| 20-08-22T 12:10:54 | DEN/CO 4 | H330 | 10 | Transaction_2 |
| 20-08-22T 12:10:54 | SFR/CA 1 | H187 | 10 | Transaction_1 |
| 20-08-22T 12:10:55 | LAN/CA 7 | H273 | 9 | C-Denial |
| 20-08-22T 12:10:55 | NYC/NY 11 | H051 | 9 | C-Denial |
| 20-08-22T 12:10:55 | DEN/CO 3 | H199 | 10 | Transaction_3 |
| 20-08-22T 12:10:56 | ATL/GA 6 | H608 | 3 | Server Reboot |
| 20-08-22T 12:10:56 | SEA/WA 3 | H192 | 9 | I-Denial |
| 20-08-22T 12:10:56 | NYC/NY 16 | H703 | 10 | Transaction_1 |

FIG. 20A

```
2020-07-30T13:17:39-08:00  INFO  [TransApp]  :  T-comp  :  ID-a3651f8
```
timestamp  level  application  action  transaction ID 2104  2102

YEAR     (?>\d\d){1,2}
MONTHNUM (?:0?[1-9]|1[0-2])
MONTHDAY (?:(?:0[1-9])|(?:[12][0-9])|(?:3[01])|[1-9])
HOUR     (?:2[0123]|[01]?[0-9])
MINUTE   (?:[0-5][0-9])
SECOND   (?:(?:[0-5]?[0-9]|60)(?:[.,][0-9]+)?)
ISO8601_TIMEZONE  (?:Z|[+-]%{HOUR}(?::?%{MINUTE}))
TIMESTAMP_ISO8601 %{YEAR}-%{MONTHNUM}-%{MONTHDAY}[T ]%{HOUR}:?%{MINUTE}(?::?%{SECOND})?%{ISO8601_TIMEZONE}?

2112

LOGLEVEL ([Aa]lert|ALERT|[Tt]race|TRACE|[Dd]ebug|DEBUG|[Nn]otice|NOTICE|[Ii]nfo|INFO|[Ww]arn?
         (?:ing)?|WARN?(?:ING)?|[Ee]rr?(?:or)?|ERR?(?:OR)?|[Cc]rit?(?:ical)?|CRIT?(?:ICAL)?
         |[Ff]atal|FATAL|[Ss]evere|SEVERE|[Ee]merg(?:ency)?|EMERG(?:ENCY)?)

DATA .*?

```
grok {
  match=>{"message"=>"%{TIMESTAMP_ISO8601:timestamp}%{LOGLEVEL:log-level}
  \[%{DATA:application}\]:%{DATA:action}:%{DATA:transaction-ID}"}
}
```
— 2120 / 2122

```
{
  "transaction-ID"=>"ID-a365108",
  "action"=>"T-comp",
  "application"=>"TransApp",
  "level"=>"INFO",
  "timestamp"=>"2020-07-30T13:17:39-08:00"
}
```
— 2124

FIG. 21C

| log type | $t_1$ | $t_2$ | count | min | max | $\sqrt{\sigma^2}$ |
|---|---|---|---|---|---|---|
| base-form-log-msg | | | | | | |
| base-form-log-msg | | | | | | |
| base-form-log-msg | | | | | | |
| base-form-log-msg | | | | | | |
| base-form-log-msg | | | | | | |

Distribution Summary

FIG. 22B

| Data_Center | Level | T1 | T2 | Count | Min | Max | StDv |
|---|---|---|---|---|---|---|---|
| | | | | | | | |
| | | | | | | | |
| | | | | | | | |
| | | | | | | | |

Dis_Summary_1 — 2706

```
SELECT  COUNT (*)
FROM Log_Messages_1
WHERE Timestamp >= X  AND
       Timestamp <= Y AND
       Level <= 8 AND
       Level >= 2
              → num_level_2_new
```
— 2708 pct_7 = num_level_7 / num_level_2_new — 2710

```
SELECT SUM(Count)
FROM  Dis_Summary_1
WHERE T1 >= X   AND
       T2 <= Y AND
       Level = 2
              → level_2_new
```
— 2712 est_level_7 = num_level_7 +(level_2_new * pct_7) — 2714

FIG. 27B

METHODS AND SYSTEMS THAT EFFICIENTLY CACHE LOG/EVENT MESSAGES IN A DISTRIBUTED LOG-ANALYTICS SYSTEM

RELATED APPLICATIONS

Benefit is claimed under 35 U.S.C. 119(a)-(d) to Foreign Application Serial No. 202041036438 filed in India entitled "METHODS AND SYSTEMS THAT EFFICIENTLY CACHE LOG/EVENT MESSAGES IN A DISTRIBUTED LOGANALYTICS SYSTEM", on Aug. 24, 2020, by VMware, Inc., which is herein incorporated in its entirety by reference for all purposes.

TECHNICAL FIELD

The current document is directed to distributed-computer-systems and, in particular, to methods and systems that efficiently cache log/event messages in log/event-message systems incorporated within distributed computer facilities.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that efficiently cache log/event messages in log/event-message systems incorporated within distributed computer facilities. The log/event-message systems provide the data-collection, data-storage, and data-querying functionalities that provide a basis for distributed log-analytics systems which, in turn, provide a basis for automated and semi-automated system-administration-and-management systems. Efficient caching significantly extends the period of time that networking failures and log/event-message processing delays can be tolerated by log/event-message systems without significant loss of information. Rather than caching individual log/event messages, message collectors that employ the currently disclosed technologies cache information regarding log/event-message types, leading to efficient compression of the cached information. As a result, message collectors can cache log/event messages without significant loss of information for time periods of several orders of magnitude greater than those achieved by caching individual log/event messages.

BRIEF DESCRIPTION OF THE DRAWINGS

FIG. 11 shows a small, 11-entry portion of a log file from a distributed computer system.

FIGS. 20A-C provide several examples of log/event-message-to-BFLM transformations.

FIGS. 21A-C illustrate one approach to extracting fields from a log/event message.

FIGS. 22A-B illustrate logical tables used to accumulate information, in compressed form, compiled by the currently disclosed efficient caching methods from log/event message received by message collectors during message-forwarding interruptions.

FIGS. 27A-B illustrates execution, by the log/event-message query subsystem, of queries against both stored log/event messages as well as stored distribution-summary information.

DETAILED DESCRIPTION

Figure 1:
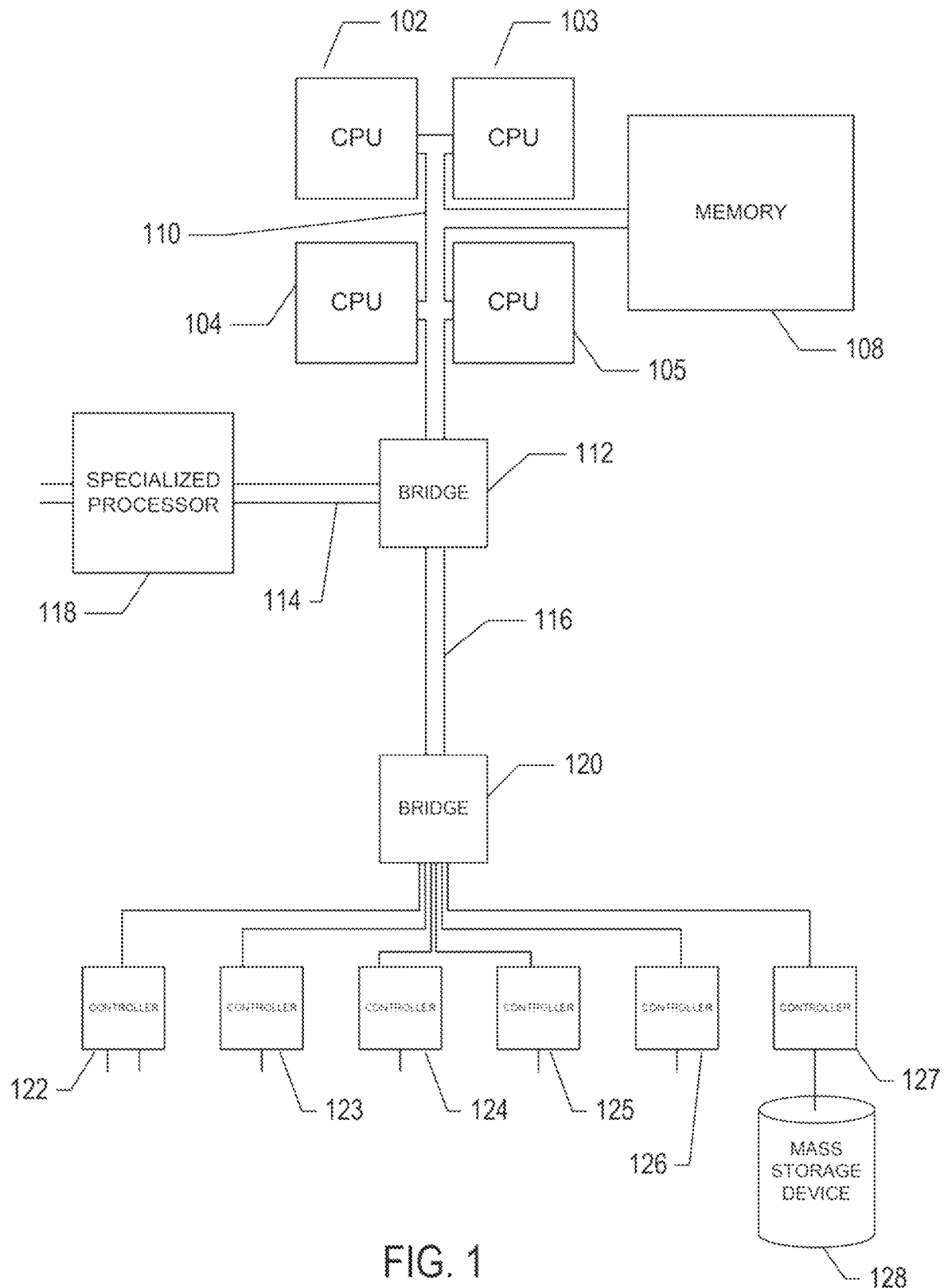
FIG. 1 provides a general architectural diagram for various types of computers.

The current document is directed to methods and systems that that efficiently transmit and process log/event messages within and among distributed computer facilities. In a first subsection, below, a detailed description of computer hardware, complex computational systems, and virtualization is provided with reference to FIGS. 1-10. In a second subsection, the currently disclosed methods and systems are discussed with reference to FIGS. 11-25.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
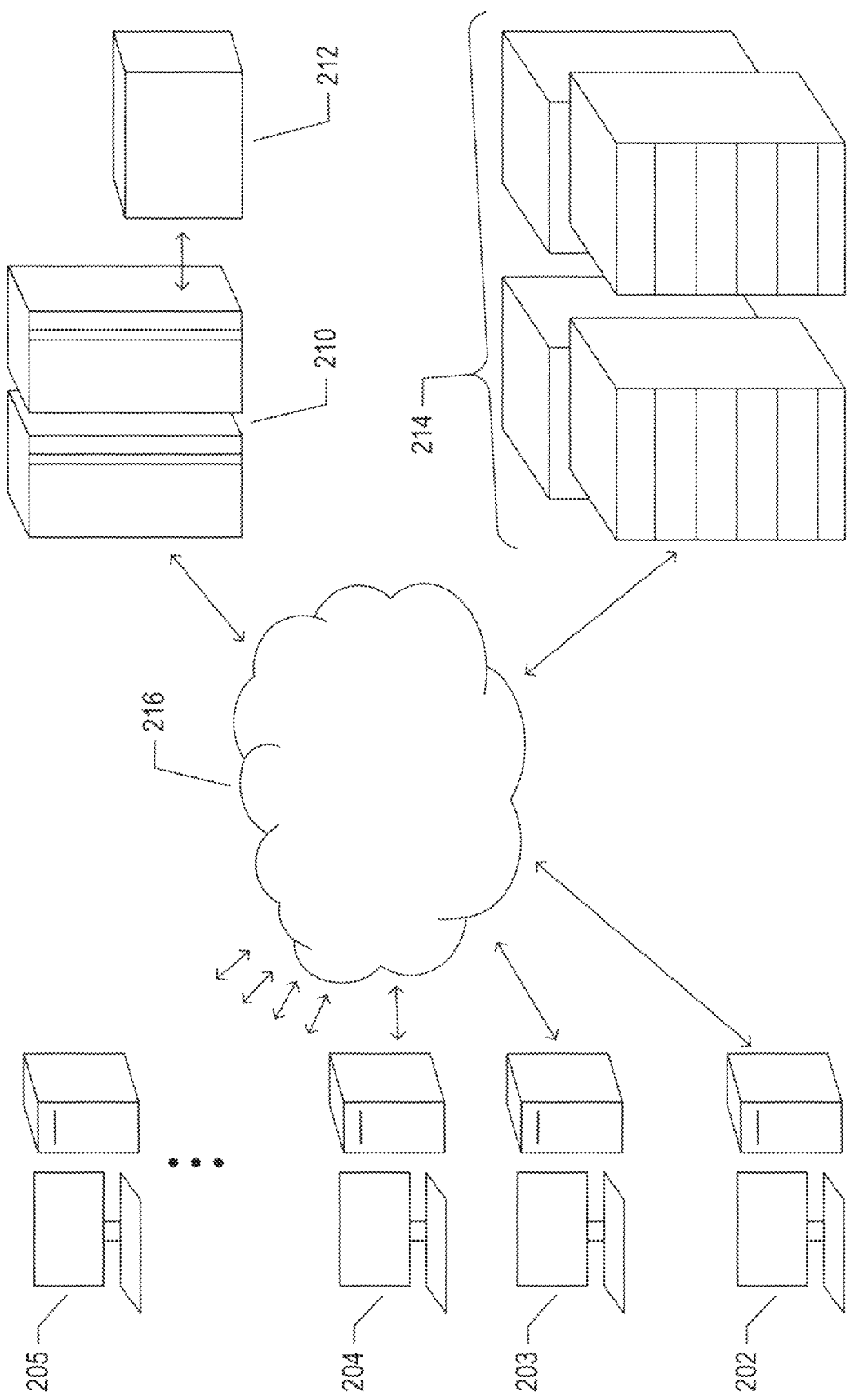
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
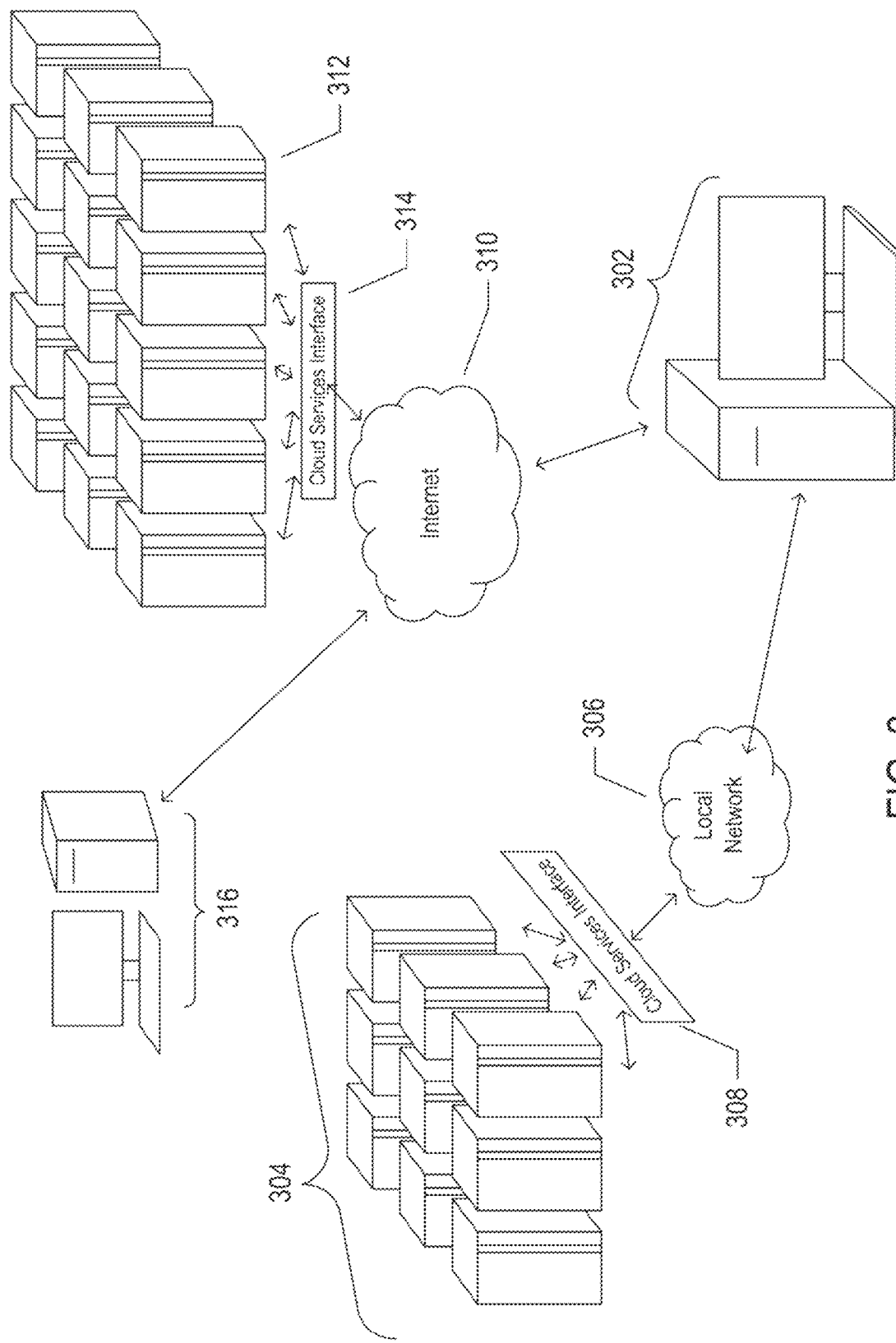
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
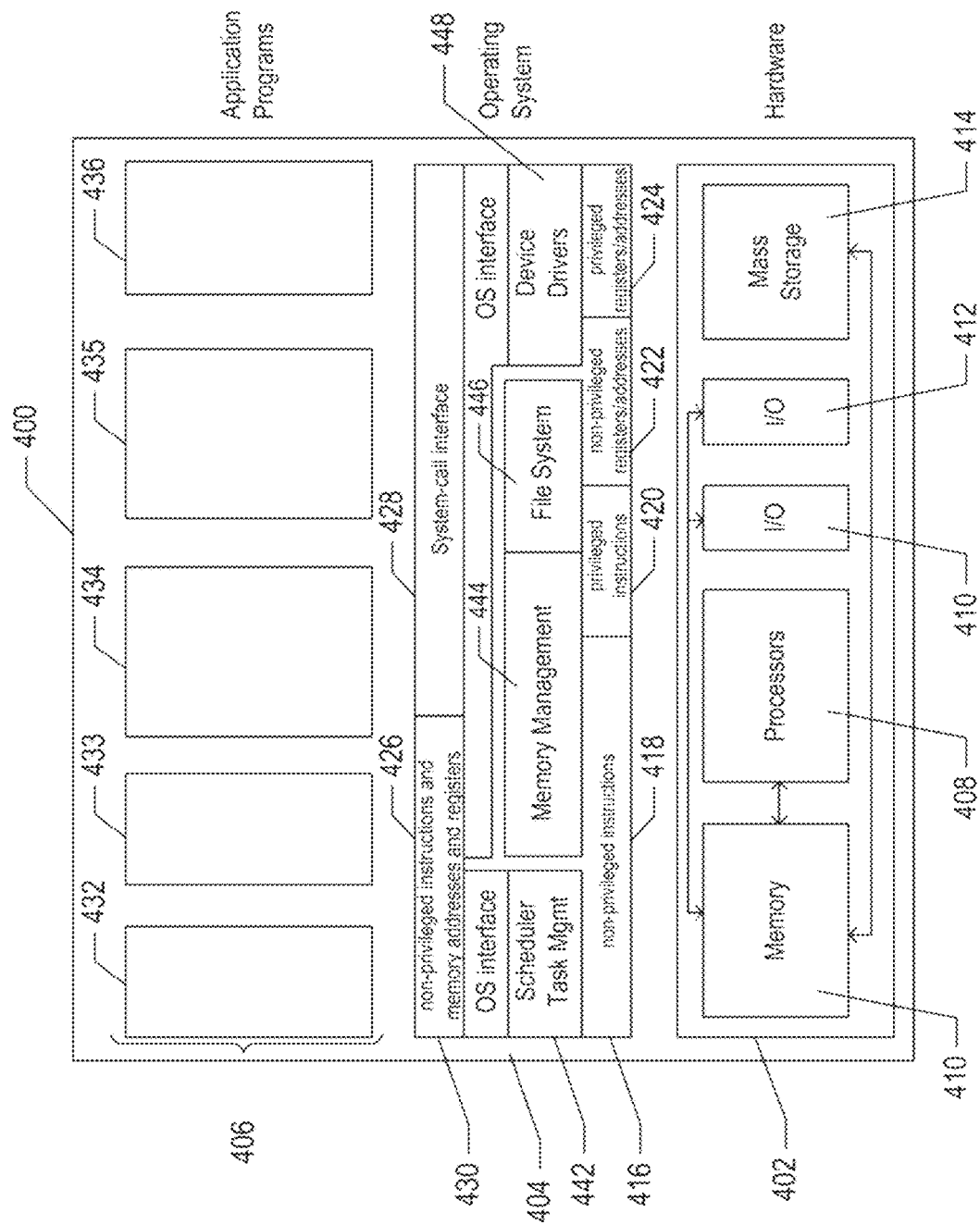
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
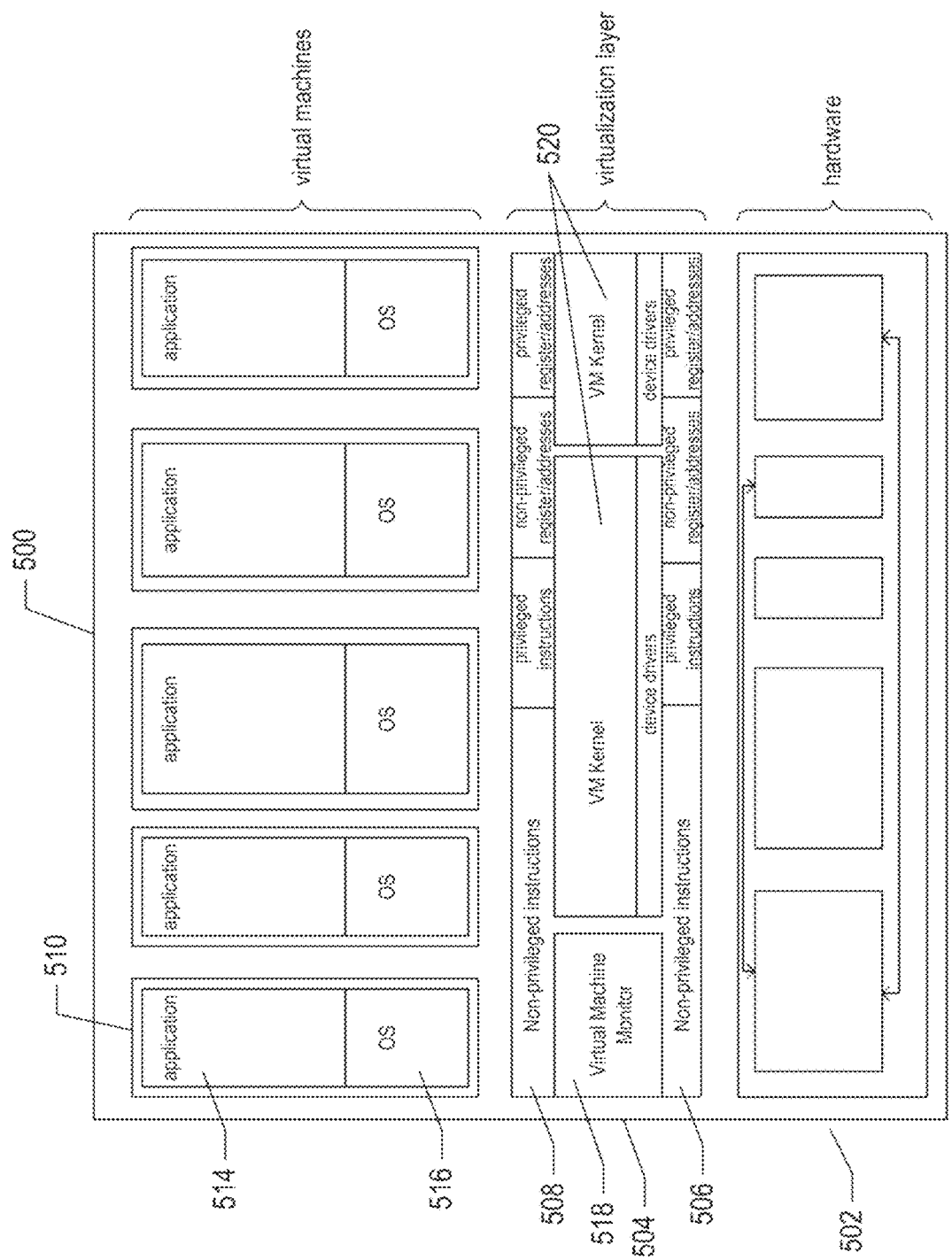
FIGS. 5A-D illustrate two types of virtual machine and virtual-machine execution environments.
Figure 5B:
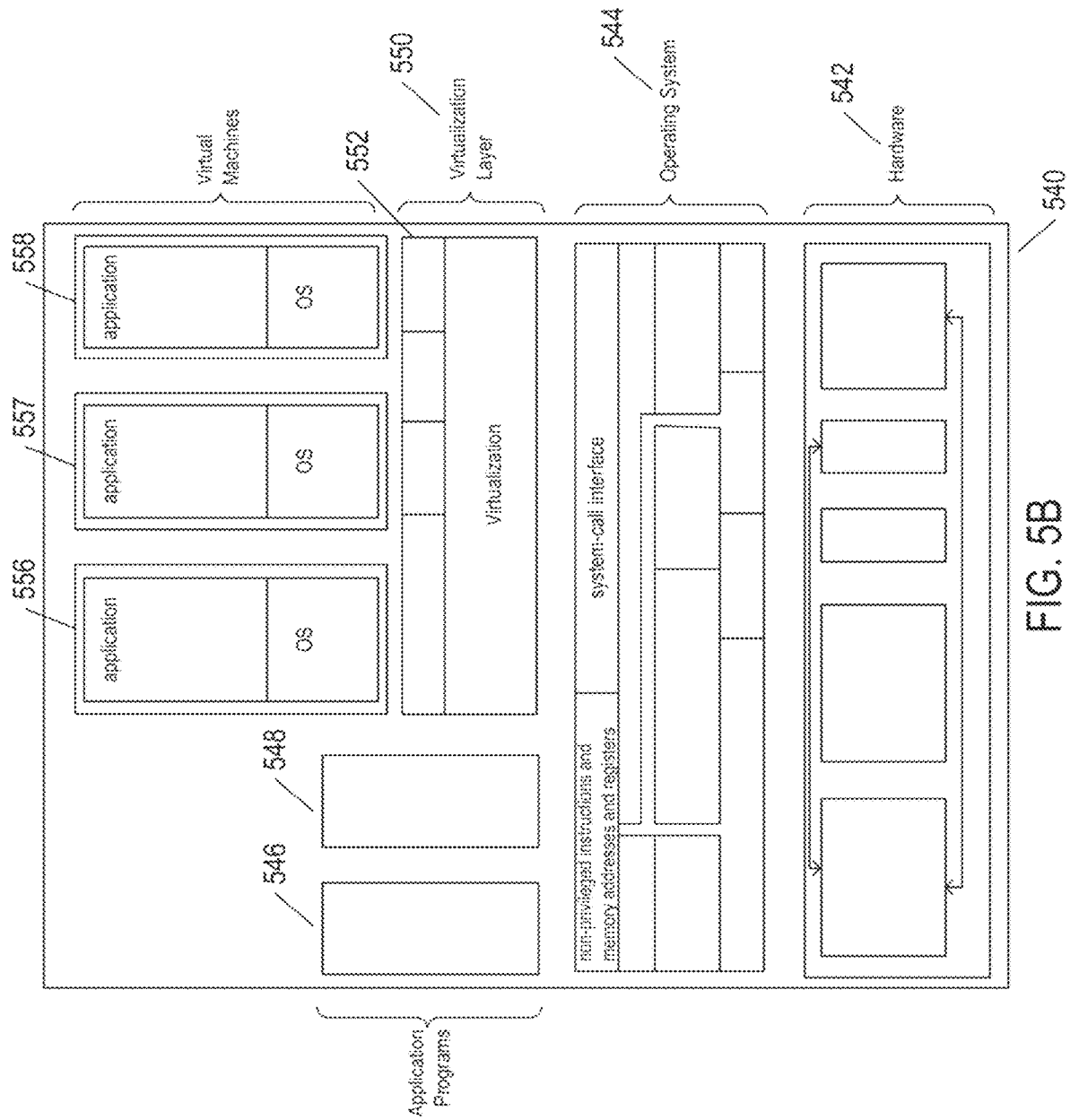

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
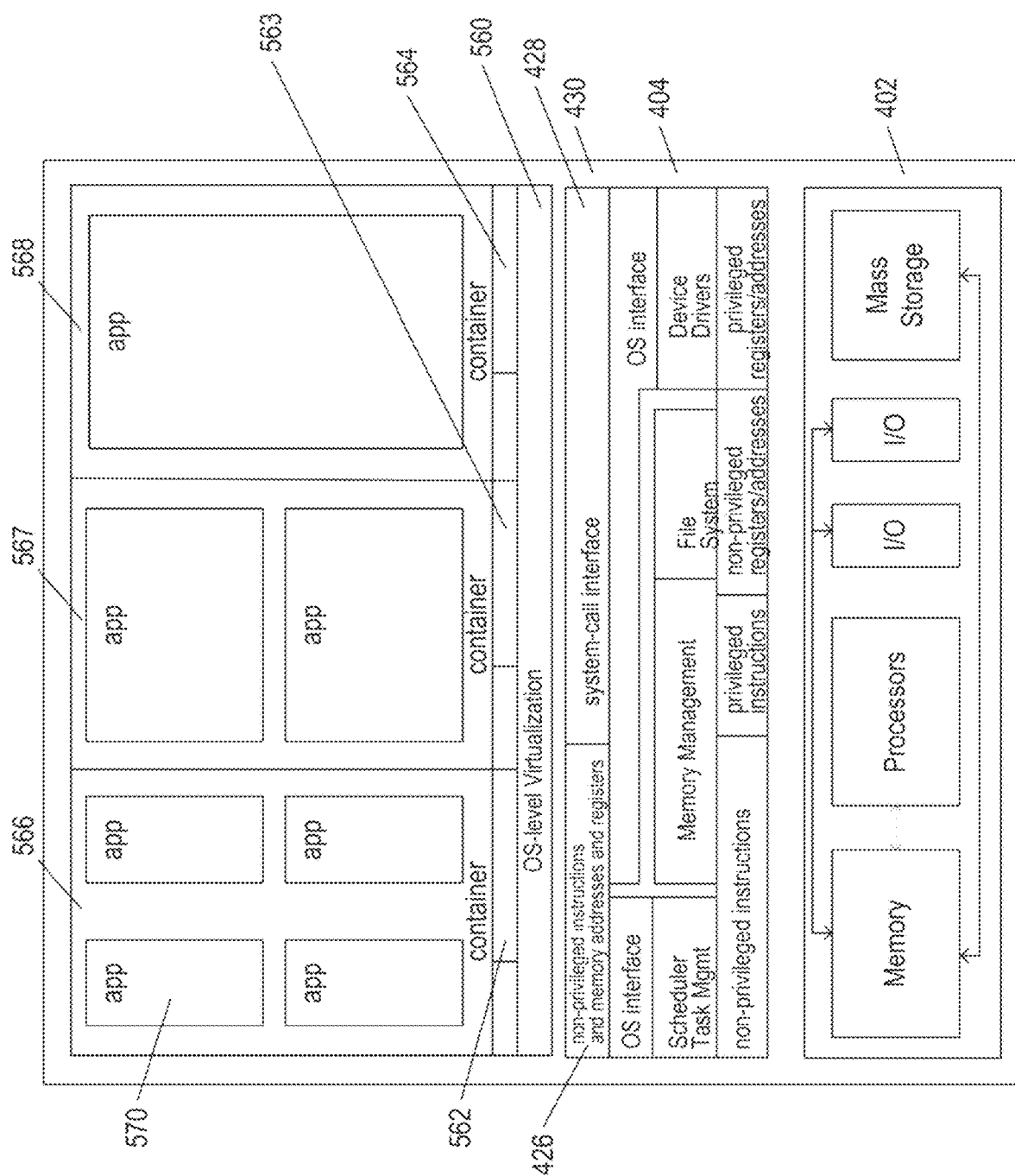

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
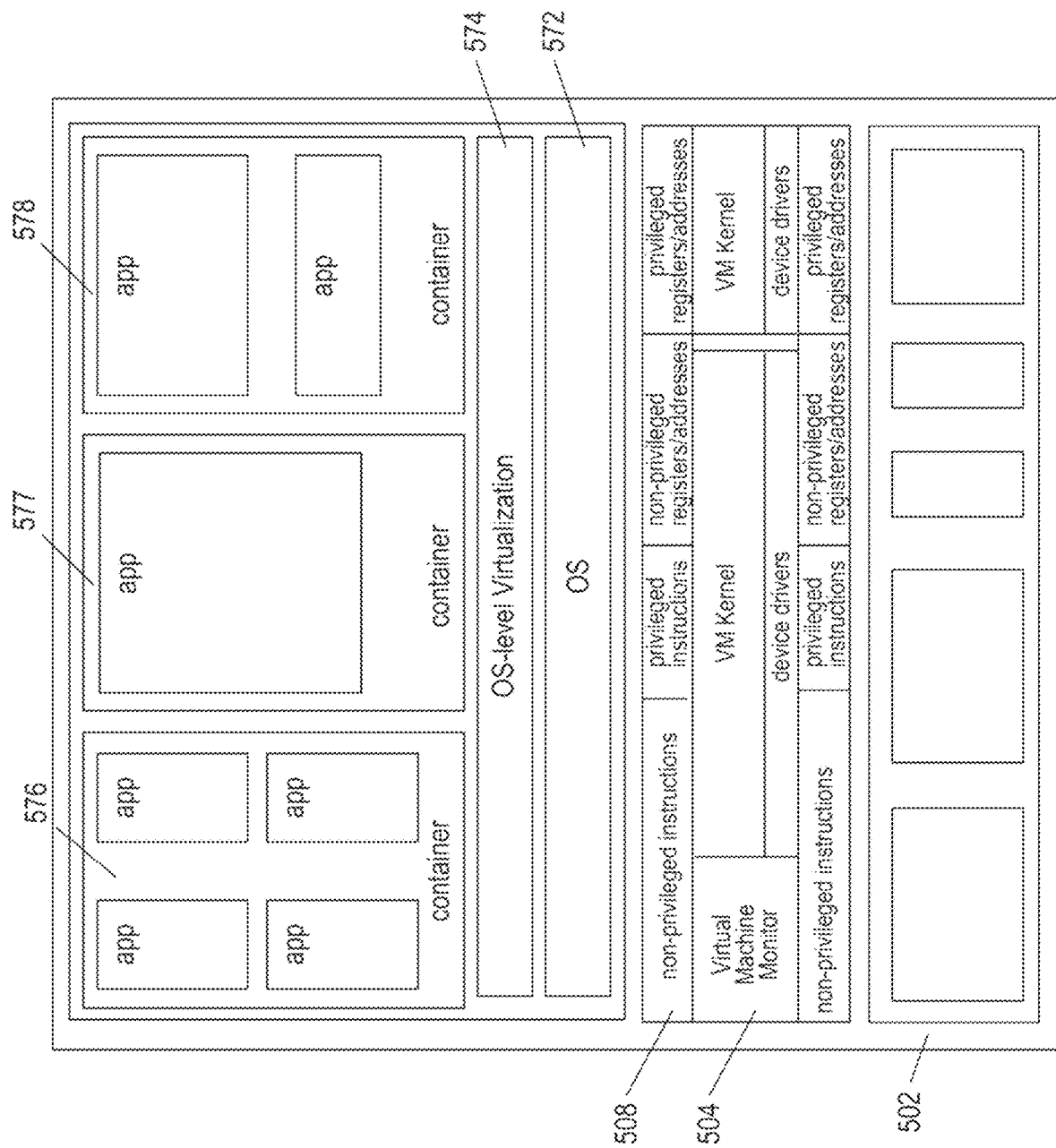

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
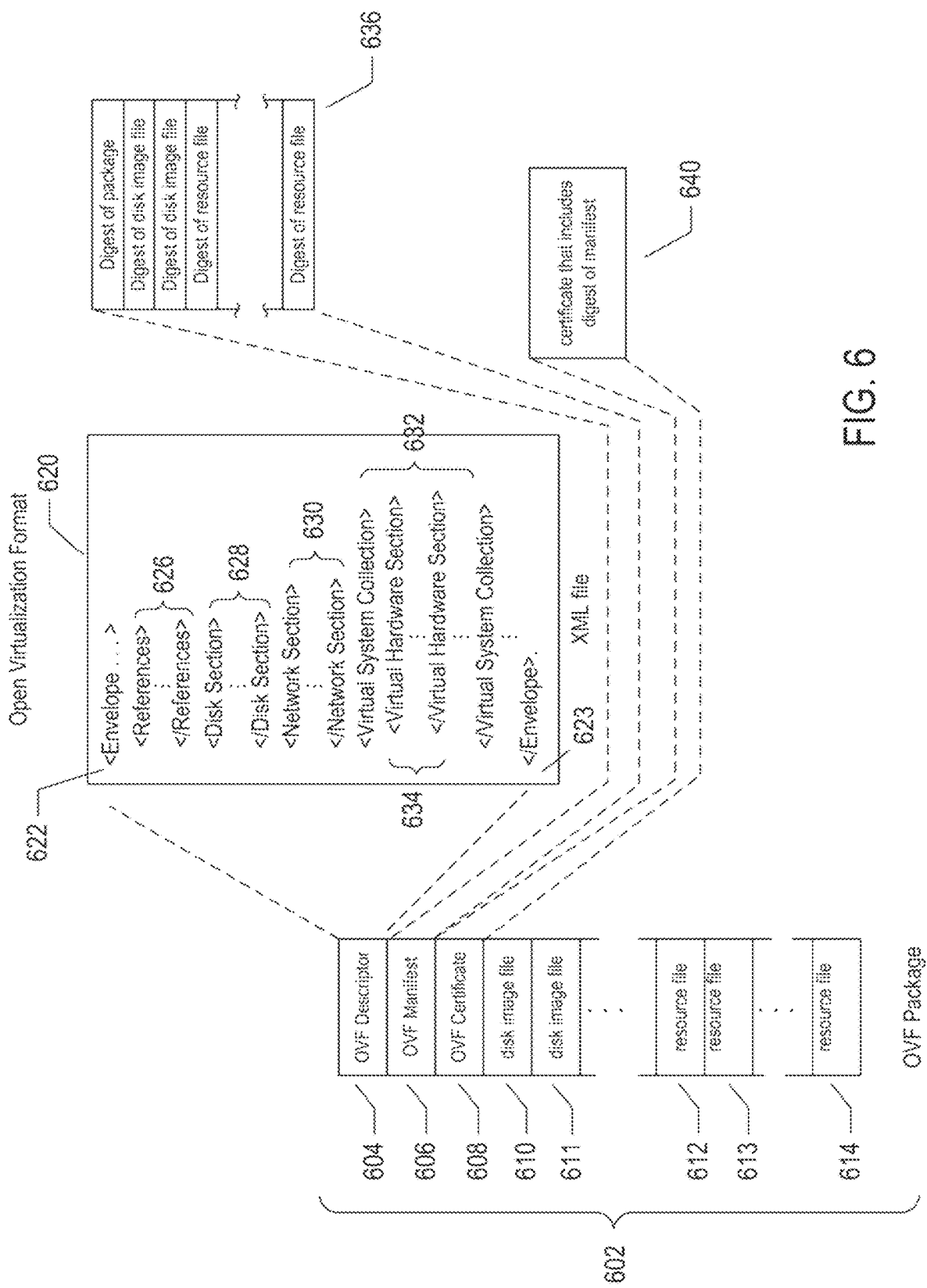
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
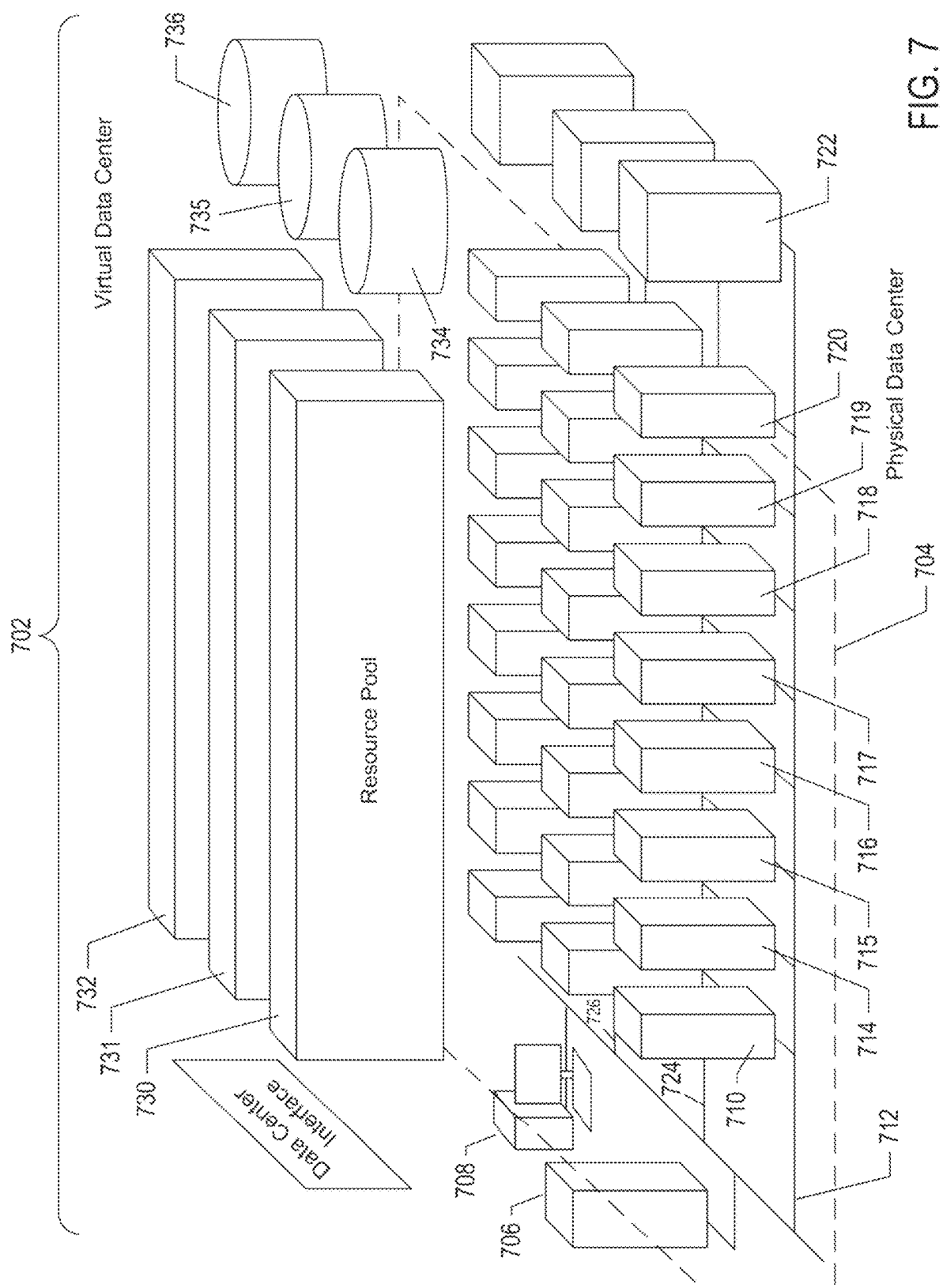
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
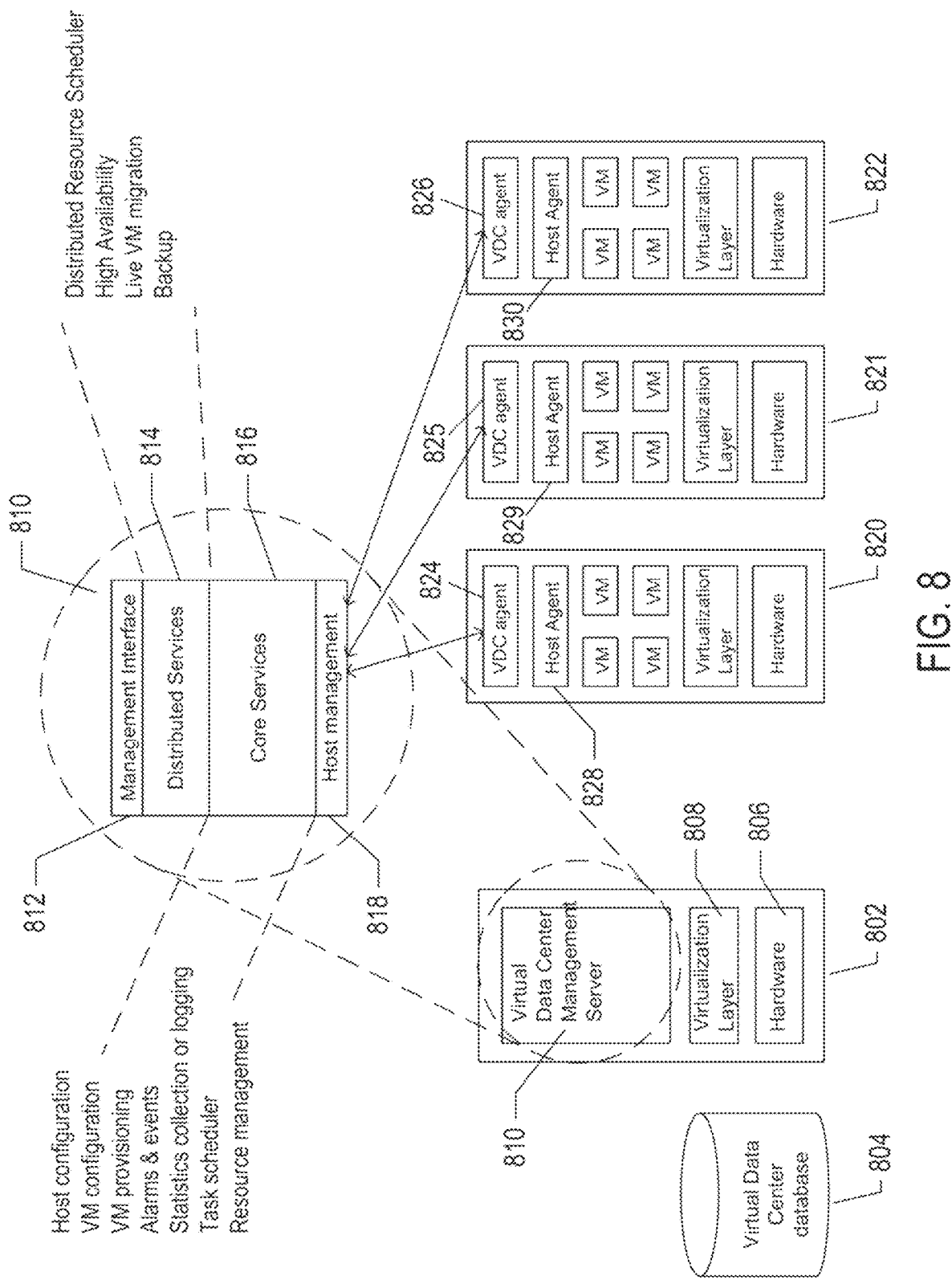
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

he core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
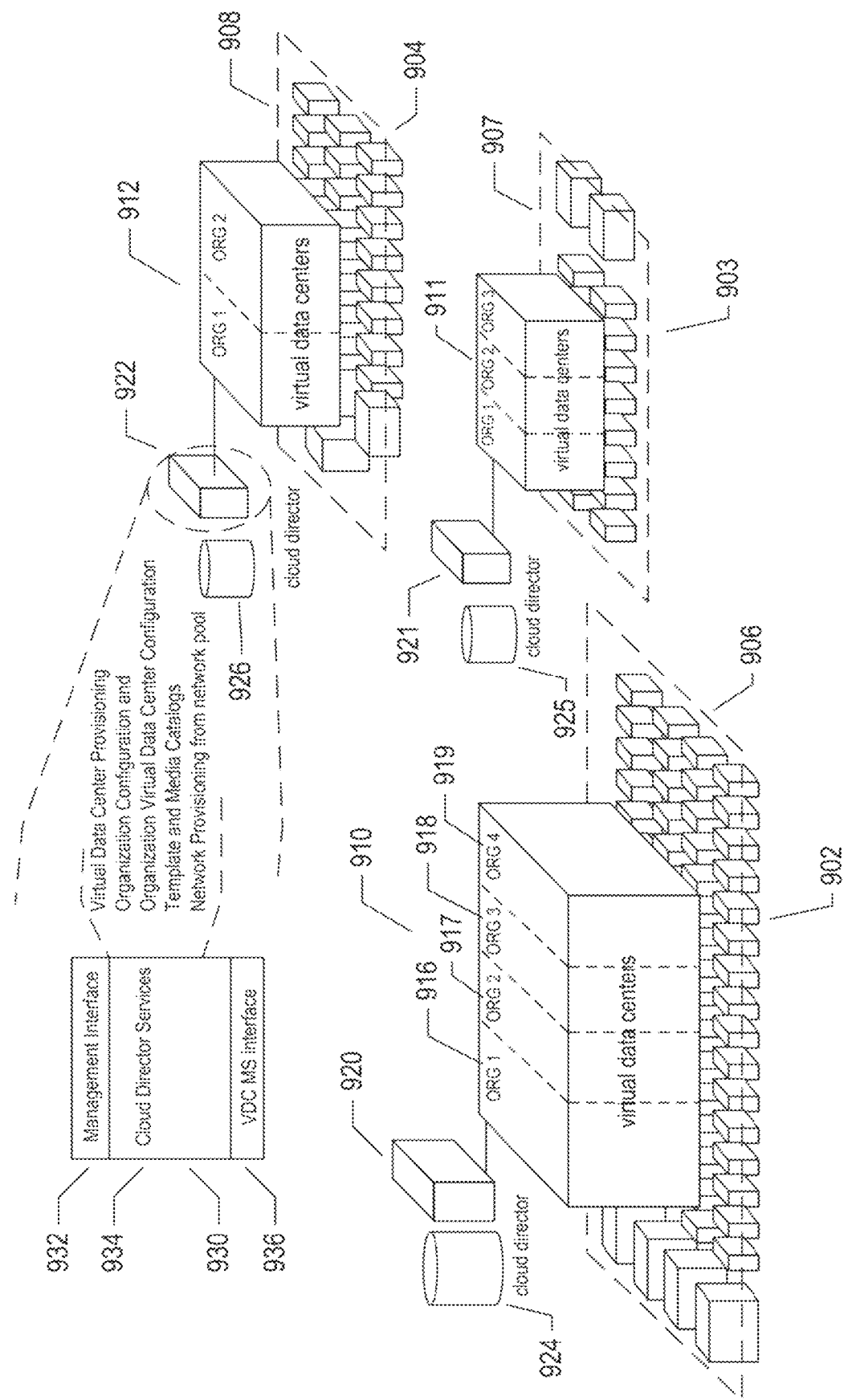
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
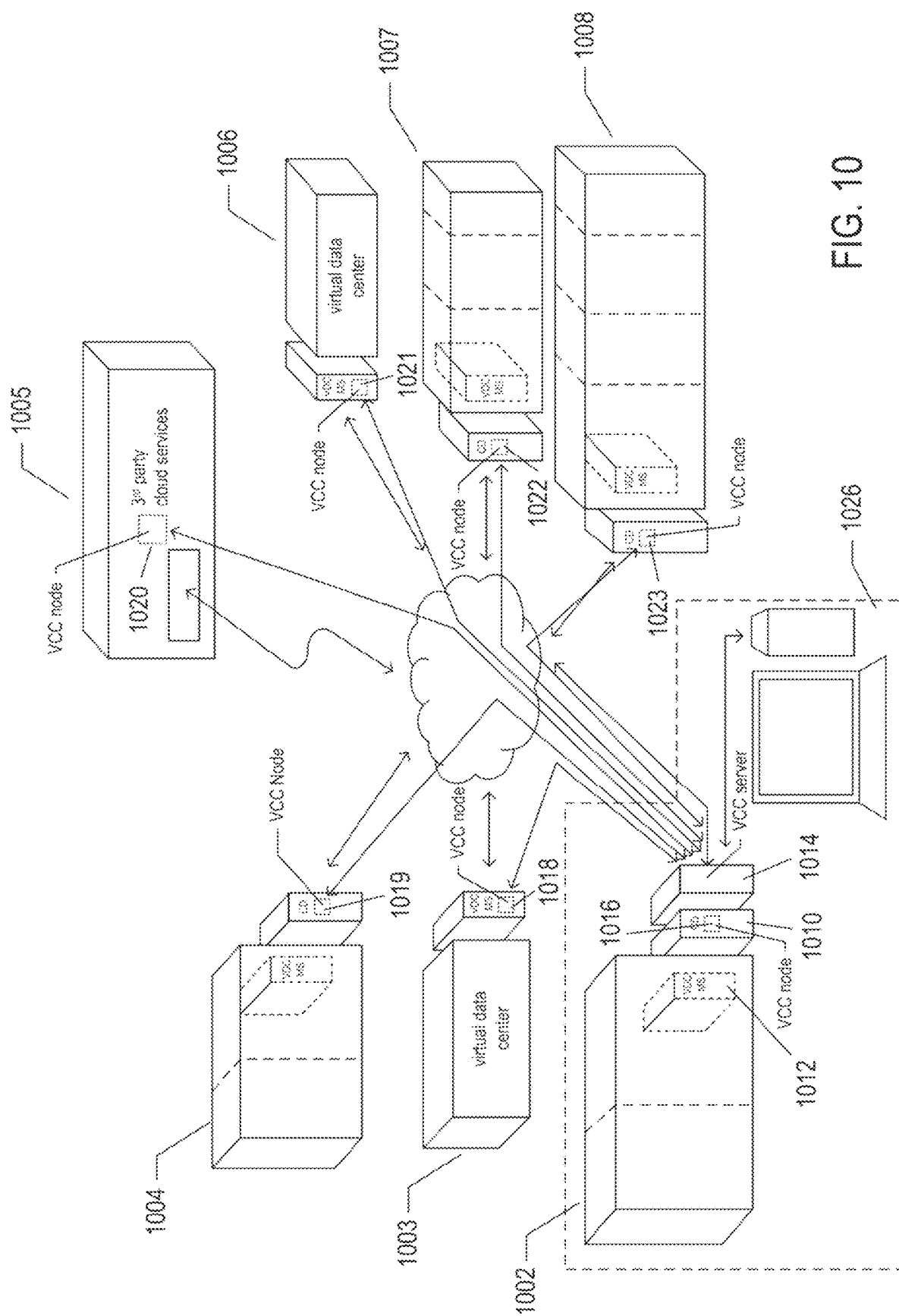
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration and management systems that detect anomalous operating behaviors of various components of the distributed computing systems, collect indications of normal operational behaviors, errors, and anomalies reported by distributed-computing-system components, and use the collected information to monitor and diagnose the operational states of the distributed computing systems in order to automatically undertake corrective and ameliorative actions to address problems as well as to alert human system administrators of potential, incipient, and already occurring problems.

Log/event-message reporting, collecting, storing, and querying systems are fundamental components of administration and management subsystems. The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers. Thus, as with many areas in computing and electronics, there are trade-offs and careful balancing considerations in developing and using log/event-messages subsystems incorporated within distributed computing systems.

Figure 11:
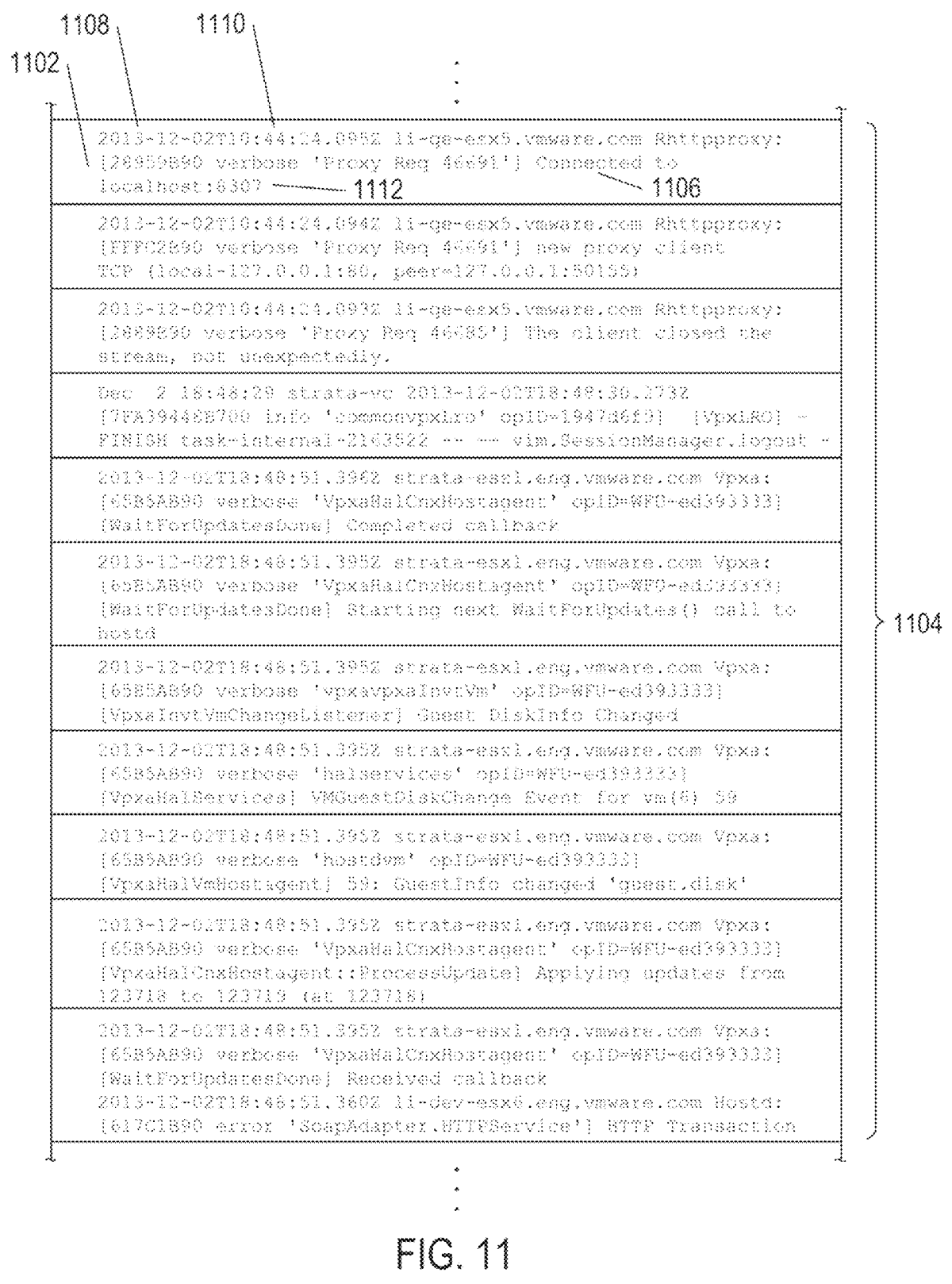

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
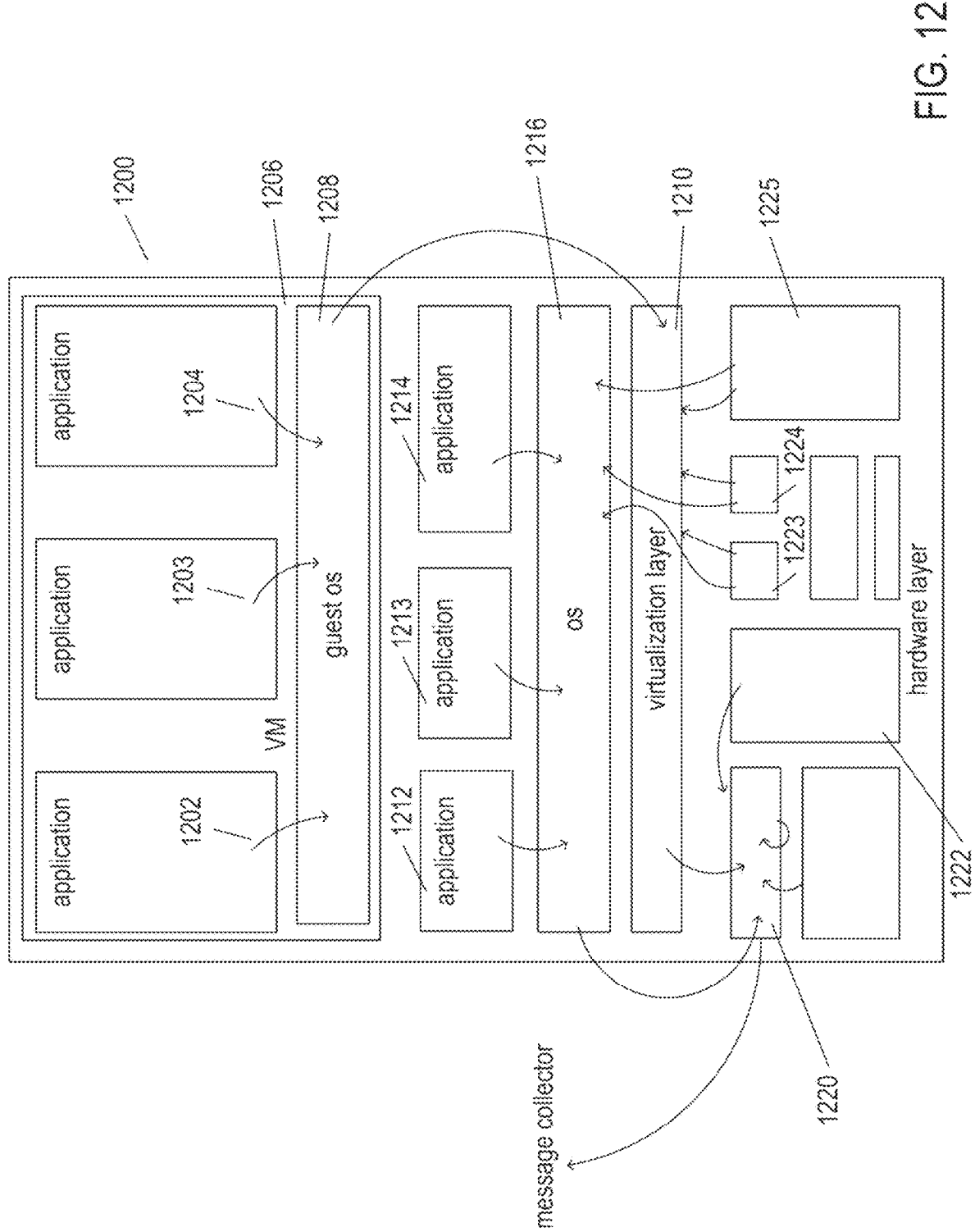
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
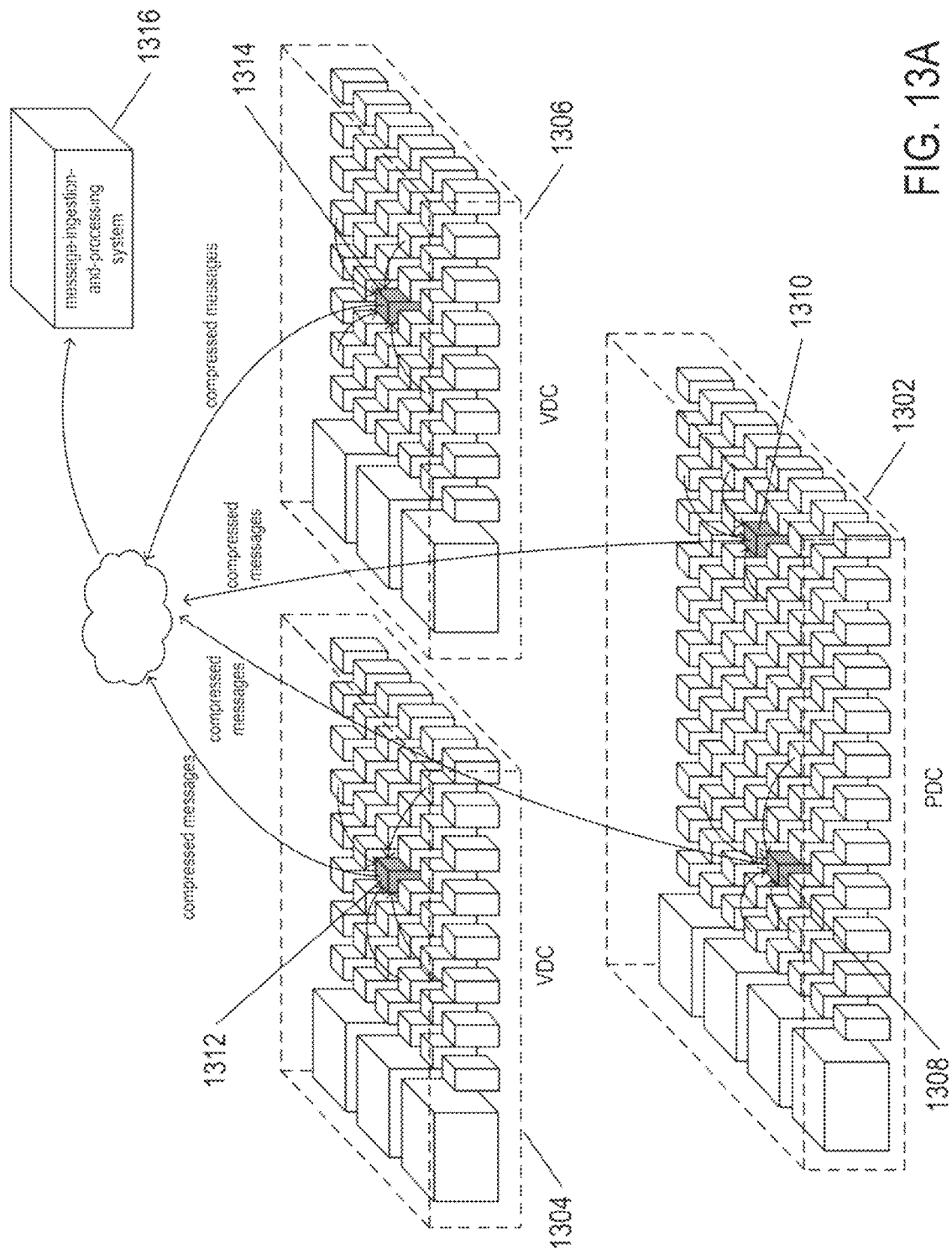
FIGS. 13A-B illustrate two different types of log/event-message collection and forwarding within distributed computer systems.
Figure 13B:
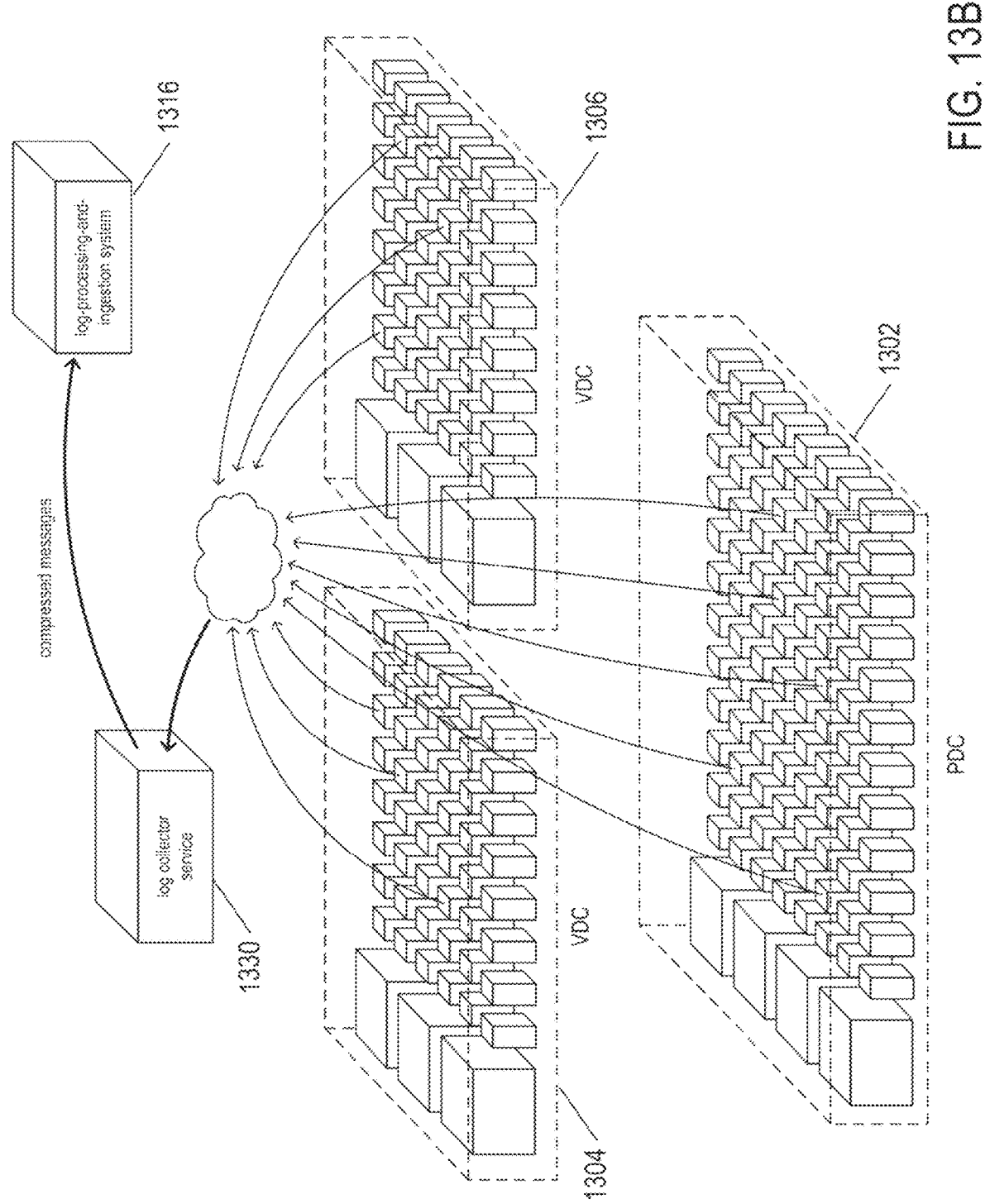

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
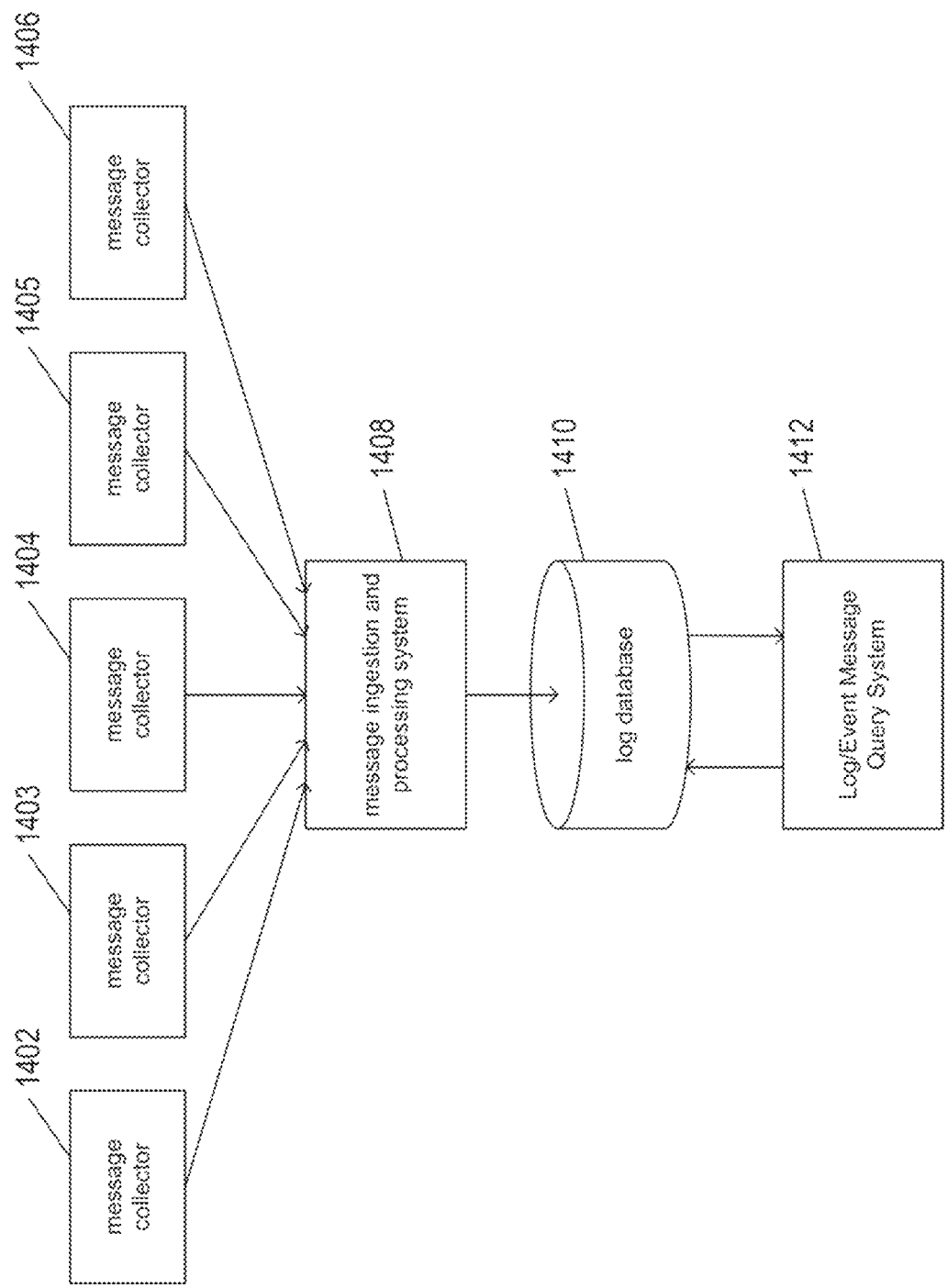
FIG. 14 provides a block diagram of a generalized log/event-message system incorporated within one or more distributed computing systems.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, encrypt the compressed messages, and send the encrypted and compressed batches of log/event messages to a message-ingestion-and-processing system 1408. The message-ingestion-and-processing system decrypts and decompresses received compressed and encrypted batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

As discussed above, enormous volumes of log/event messages are generated within modern distributed computing systems. As a result, message collectors are generally processor-bandwidth bound and network-bandwidth bound. Message-ingestion-and-processing systems are associated with similar network-bandwidth and processor-bandwidth overheads, but also use large amounts of data-storage capacities within the computing systems in which they reside. Because of the severe computational, data-storage, and networking burdens associated with collecting and processing log/event messages, when message processing by message-ingestion-and-processing systems slows or is temporarily halted, when network connections between message collectors and message-ingestion-and-processing systems fail, and when the bandwidths of the network connections significantly decrease due to traffic loads and increasing transmission latencies, message collectors are generally incapable of storing incoming log/event messages for more than relatively short periods of time before internal caches are exhausted and either subsequently arriving log/event messages must be discarded and/or the internal caches must overwritten, resulting in previously cached log/event messages being discarded. When log/event messages are discarded, or dropped, potentially important and critical information may be lost, such as sequences of warning and error messages that would otherwise be identified as indicating various types of accelerating system problems and deficiencies that may lead to catastrophic system crashes, data loss and corruption, and other undesirable conditions. The amount of time that a message collector can internally cache log/event messages before internal caches are exhausted depends on various characteristics and parameters of particular message-collector implementations. However, in many distributed computer systems, the time periods during which log/event-message caching can be used to prevent information loss may be on the order of seconds to minutes, while the networking and message-processing problems that result in a need for log/event-message caching may often extend for minutes to hours. Thus, many current distributed computer systems frequently suffer information losses that significantly impair the ability of automated distributed-computing-system management-and-administration systems to detect incipient and already serious problems and to forestall the serious consequences that may ensue when the incipient and already serious problems are not addressed in a timely fashion.

Figure 15:
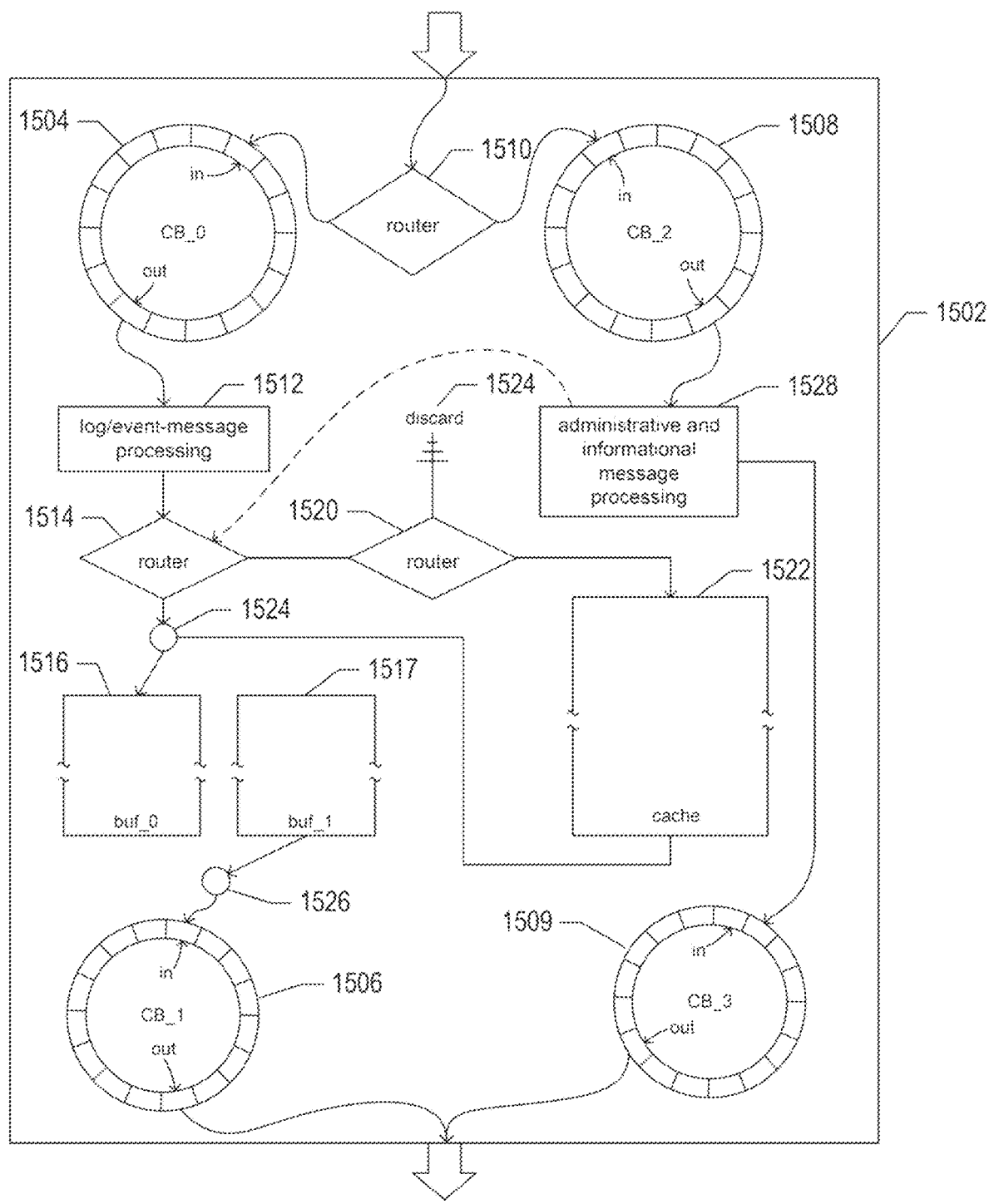
FIG. 15 illustrates an example implementation of a message collector that employs an internal cache to avoid dropping log/event messages during periods of delayed log/event-message processing by message-ingestion-and-processing systems, network failure, or other such problems that prevent message collectors from being able to sufficiently rapidly transmit received log/event messages in order to continuously process incoming log/event messages.

FIG. 15 illustrates an example implementation of a message collector that employs an internal cache to avoid dropping log/event messages during periods of delayed log/event-message processing by message-ingestion-and-processing systems, network failures, and when other such problems prevent message collectors from being able to sufficiently rapidly transmit received log/event messages in order to continuously process incoming log/event messages without accumulating processed but as yet unforwarded log/event messages. The message collector 1502 includes a first circular buffer 1504, or circular queue, into which log/event messages are input from one or more networks and a second circular buffer 1506, or circular queue, into which outgoing log/event messages containing compressed and encrypted message batches are input for transmission to one or more message-ingestion-and-processing systems. In addition, a second pair of circular buffers 1508-1509 are used for receiving non-log/event messages and transmitting responses to those messages to the network. A first router 1510 routes incoming log/event messages to circular buffer 1504 and non-log/event messages to circular buffer 1508. Log/event messages are removed from circular buffer 1504 and processed by a log/event-message-processing subsystem 1512, which forwards the processed log/event messages to a second router 1514. When the message collector is normally transmitting received and processed log/event messages to a message-ingestion-and-processing system, the second router 1514 forwards the processed log/event messages to a pair of internal buffers 1516-1517. Otherwise, during periods in which processed log/event messages cannot be forwarded to a message-ingestion-and-processing system, the second router forwards the processed log/event messages to a third router 1520. The third router 1520 forwards processed log/event messages to an internal cache 1522 when the cache still has capacity for storing an additional log/event message and otherwise drops received processed log/event messages 1524. Alternatively, the internal cache can be continuously overwritten, once exhausted, by log/event messages output from the second router 1514. In either case, of course, information is lost when log/event messages are dropped. The internal buffers 1516-1517 are used for message compression and encryption. As one of the internal buffers is loaded with processed log/event messages, compression and encryption methods are applied to the other of the internal buffers, already loaded with messages, and the resulting compressed and encrypted message batch is output to the second circular queue. The directions of the two switches 1524 and 1526 are then inverted so that compression and encryption can be applied to the now loaded internal buffer while processed log/event messages are loaded into the other, emptied internal buffer. And administrative-and-informational-message-processing subsystem 1528 processes non-log/event messages and generates responses to those messages. The response messages are input to circular buffer 1509 for transmission through the network.

A message collector may be implemented as an application within a virtual machine, as a standalone application or routine running within a physical server, or as a special-purpose appliance or device, and may include many additional and/or different types of logic and logical components. However, the simple logical implementation shown in FIG. 15 encapsulates salient design features of a message collector. First, the message collector needs to be streamlined for rapid input and processing of log/event messages from log/event-message sources. There is generally little computational bandwidth available for additional types of message processing, due to the high volumes of log/event messages constantly arriving from the network. Depending on the implementation, certain underlying networking protocols may provide for acknowledgments of incoming log/event messages and guaranteed delivery, but message controllers generally lack the computational resources to provide for sophisticated networking protocols and functionality. In the following control-flow diagrams, the first circular queue is referred to as CB_0, the second circular queue is referred to as CB_1, the third circular queue is referred to as CB_2, the fourth circular queue is referred to as CB_3, and the two internal buffers are referred to as buf_0 and buf_1.

Figure 16A:
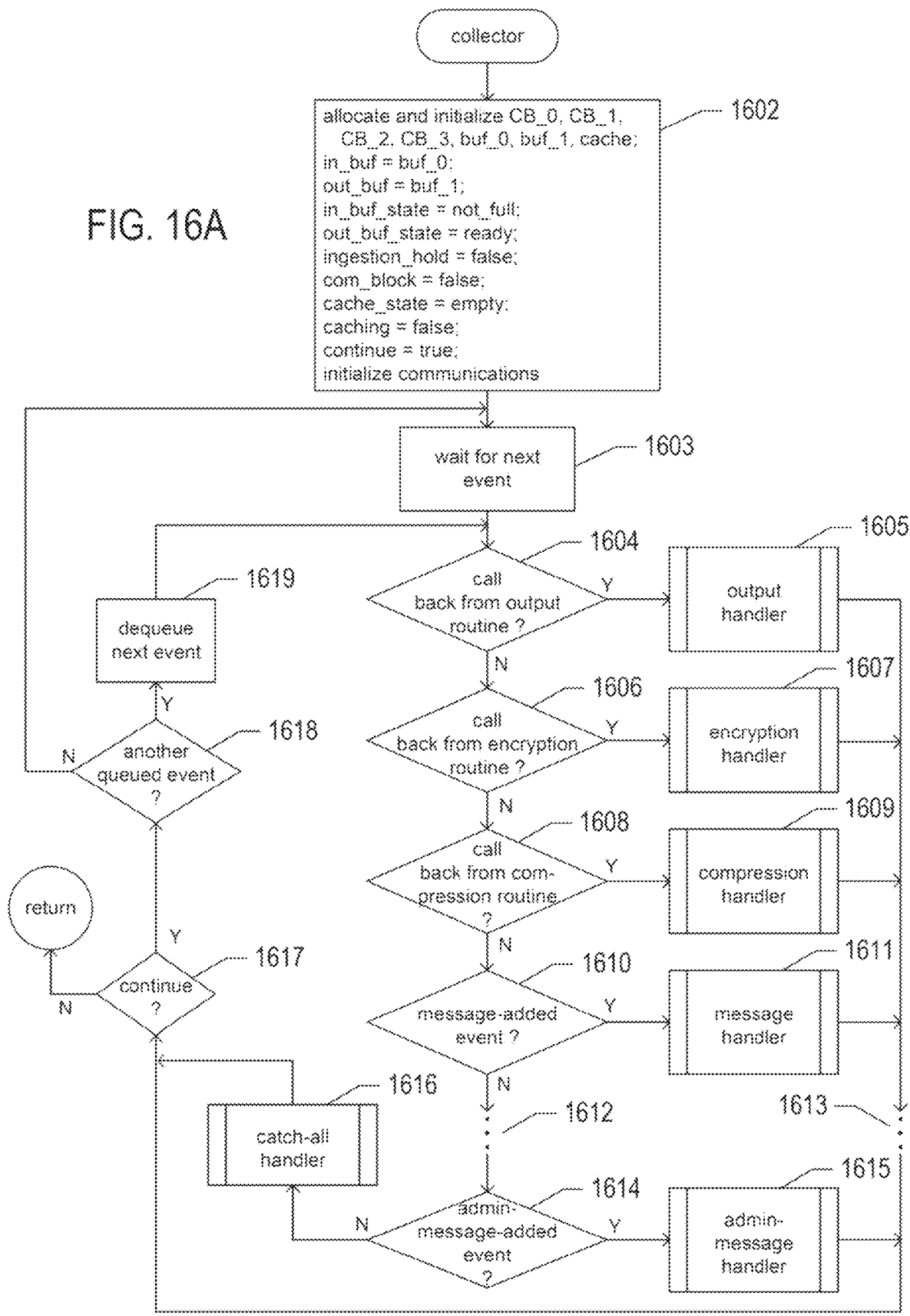
FIGS. 16A-H provide control-flow diagrams for one implementation of the message controller, discussed above with reference to FIG. 15.

FIGS. 16A-H provide control-flow diagrams for one implementation of the message controller, discussed above with reference to FIG. 15. FIG. 16A provides a control-flow diagram for a routine collector which comprises an event loop underlying implementation of the message collector. In step 1602, upon power-up or restart, the circular buffers, cache, and internal buffers are allocated and initialized, the buffer pointer in_buf is initialized to point to internal buffer buf_0 and the buffer pointer out_buf is initialized to point to internal buffer buf_1, the local variable in_buf_state is set to not_full and the local variable out_buf_state is set to ready, a local variable ingestion_hold is set to false, a local variable com_block is set to false, a local variable cache_state is set to empty, a local variable caching is set to false, a local variable continue is set to true, and the communications connections that connect the message collector to the network are initialized. The local variable in_buf_state indicates a current state of the internal buffer referenced by the buffer pointer in_buf, with states including: (1) full; and (2) not_full. The local variable out_buf_state indicates a current state of the internal buffer referenced by the buffer pointer out_buf, with states including: (1) ready; (2) compressing; (3) encrypting; and (4) outputting. The local variable ingestion_hold indicates whether or not forwarding of log/event messages by the message collector to the message-ingestion-and-processing system is currently blocked. In many implementations, forwarding of log/event messages may be blocked by the message-ingestion-and-processing system, which sends a hold request to the message collector in a non-log/event message, and similarly unblocked by sending an unblock request to the message collector. The local variable com_block indicates whether or not the network connection between the message collector and the message-ingestion-and-processing system is currently operating. The local variable cache_state indicates the current state of the internal cache, with cache states including: empty; and not_empty. The local variable caching indicates whether or not the message collector is currently caching log/event messages or is, instead, forwarding log/event messages to the message-ingestion-and-processing system. The local variable continue indicates whether or not the message collector has received a signal indicating that the message collector should terminate log/event-message collection and forwarding.

In step 1603, the routine collector waits for the occurrence of a next event. When the next occurring event is a callback from the routine output, as determined in step 1604, control flows to step 1605, where the routine output handler is called. The routine output handler transfers an encrypted batch of messages in an internal buffer referenced by buffer pointer out_buf to the network for transmission to the message-ingestion-and-processing system. When the next occurring event is a callback from the routine encrypt, as determined in step 1606, control flows to step 1607, where the routine encryption handler is called. The routine encryption handler calls the routine output to transmit a compressed and encrypted batch of messages in the internal buffer referenced by buffer pointer out_buf to one or more message-ingestion-and-processing systems. When the next occurring event is a callback from the routine compress, as determined in step 1606, control flows to step 1607, where the routine compression handler is called. The routine compression handler calls the routine encrypt to encrypt a batch of compressed messages in the internal buffer referenced by buffer pointer out_buf. When the next occurring event is a message_added event, as determined in step 1610, the routine message handler is called, in step 1611. A message_added event is generated when one or more additional log/event messages are added to CB_0 or is generated to quickly restart incoming log/event-message processing. Ellipses 1612 and 1613 indicate that additional types of events can be handled by the event loop. The routine message handler dequeues messages from CB_0 and forwards them to the internal buffers or to the cache and may also retrieve cached messages from of the cache for forwarding to the internal buffers. When the next occurring event is an admin-message_added event, as determined in step 1614, the routine admin-message handler is called, in step 1615. An admin-message_added event is generated when additional messages are added to CB_2. The routine admin-message handler dequeues messages from CB_2, generates responses to the dequeued messages, and forwards the responses to CB_3 for transmission to the network. A catch-all, or default, handler is called, in step 1616, to handle any rare or unexpected events. When the default handler returns with an indication to continue execution of the event loop, as determined in step 1617, control flows back to either step 1603 or step 1604 to continue execution of the event loop, depending on whether additional events have been received and queued for processing.

Figure 16B:
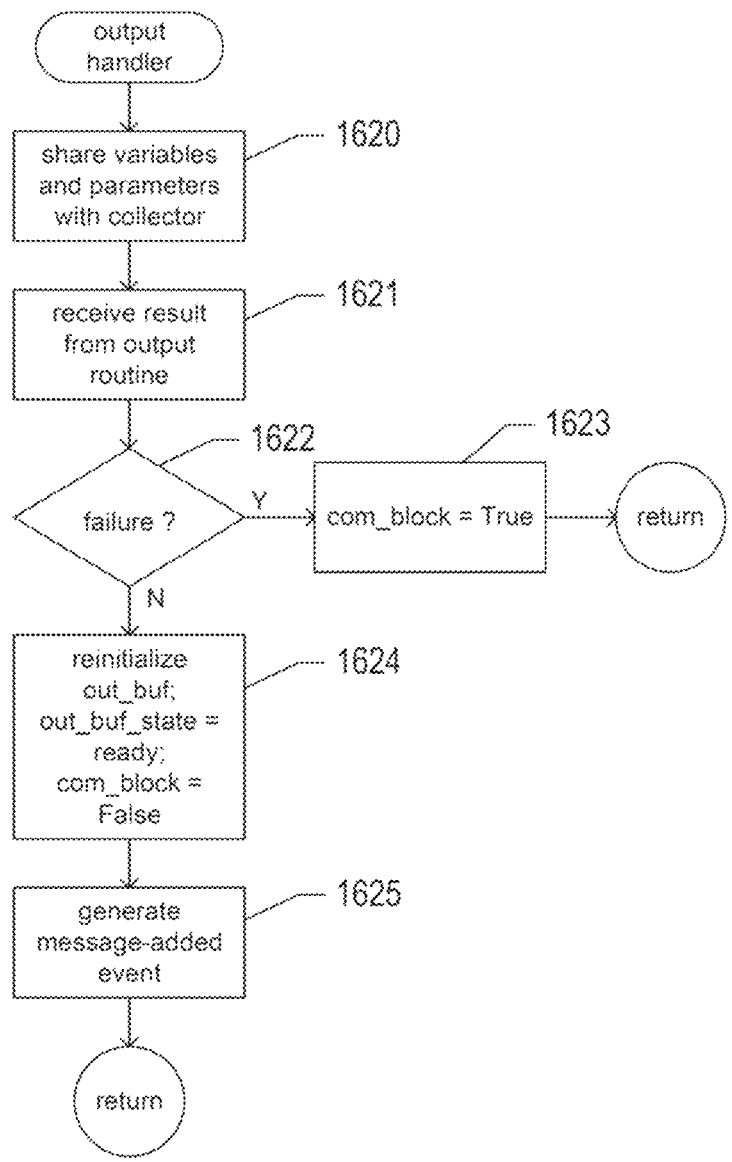

FIG. 16B provides a control-flow diagram for the routine output handler, called in step 1605 of FIG. 16A. Step 1620 indicates that the routine output handler shares variables and parameters with the routine collector, discussed above with reference to FIG. 16A. Similar steps are included as the first steps in the control-flow diagrams provided in FIGS. 16C-H, discussed below. In step 1621, the routine output handler receives a result from the routine output, discussed below, which outputs compressed and encrypted data from an internal buffer to a circular buffer for transmission to the network. When the received result indicates that output to the network failed, as determined in step 1622, the local variable com_block is set to true, in step 1623, and the routine output handler terminates. Otherwise, in step 1624, the internal buffer pointed to by the buffer pointer out_buf is reinitialized, the local variable out_buf_state is set to ready, and the local variable com_block is set to false. In step 1625, a message-added event is generated to restart processing of incoming log/event messages.

Figure 16C:
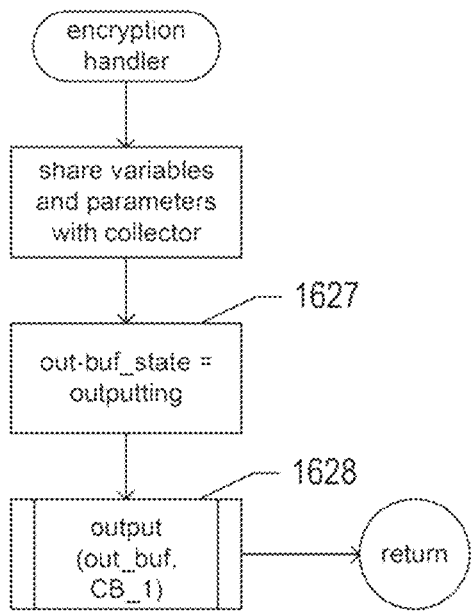

FIG. 16C provides a control-flow diagram for the routine encryption handler, called in step 1607 of FIG. 16A. In step 1627, the local variable out_buf_state is set to outputting, and, in step 1628, the routine output is called to output the contents of the internal buffer pointed to by the buffer pointer out_buf to the network.

Figure 16D:
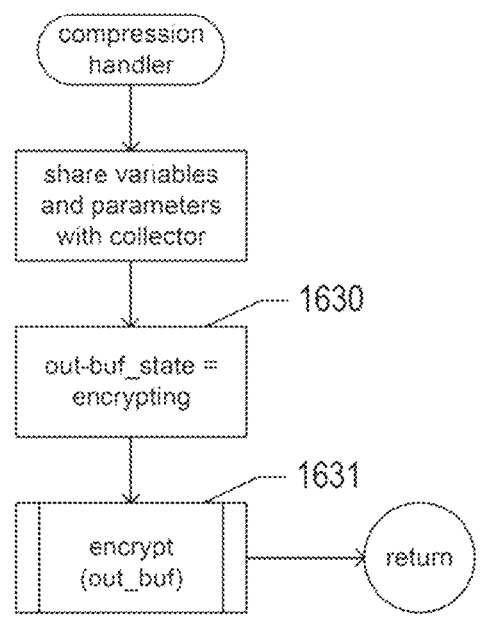

FIG. 16D provides a control-flow diagram for the routine compression handler, called in step 1609 of FIG. 16A. In step 1630, the local variable out_buf_state is set to encrypting, and, in step 1631, the routine encrypt is called to encrypt the contents of the internal buffer pointed to by the buffer pointer out_buf.

Figure 16E:
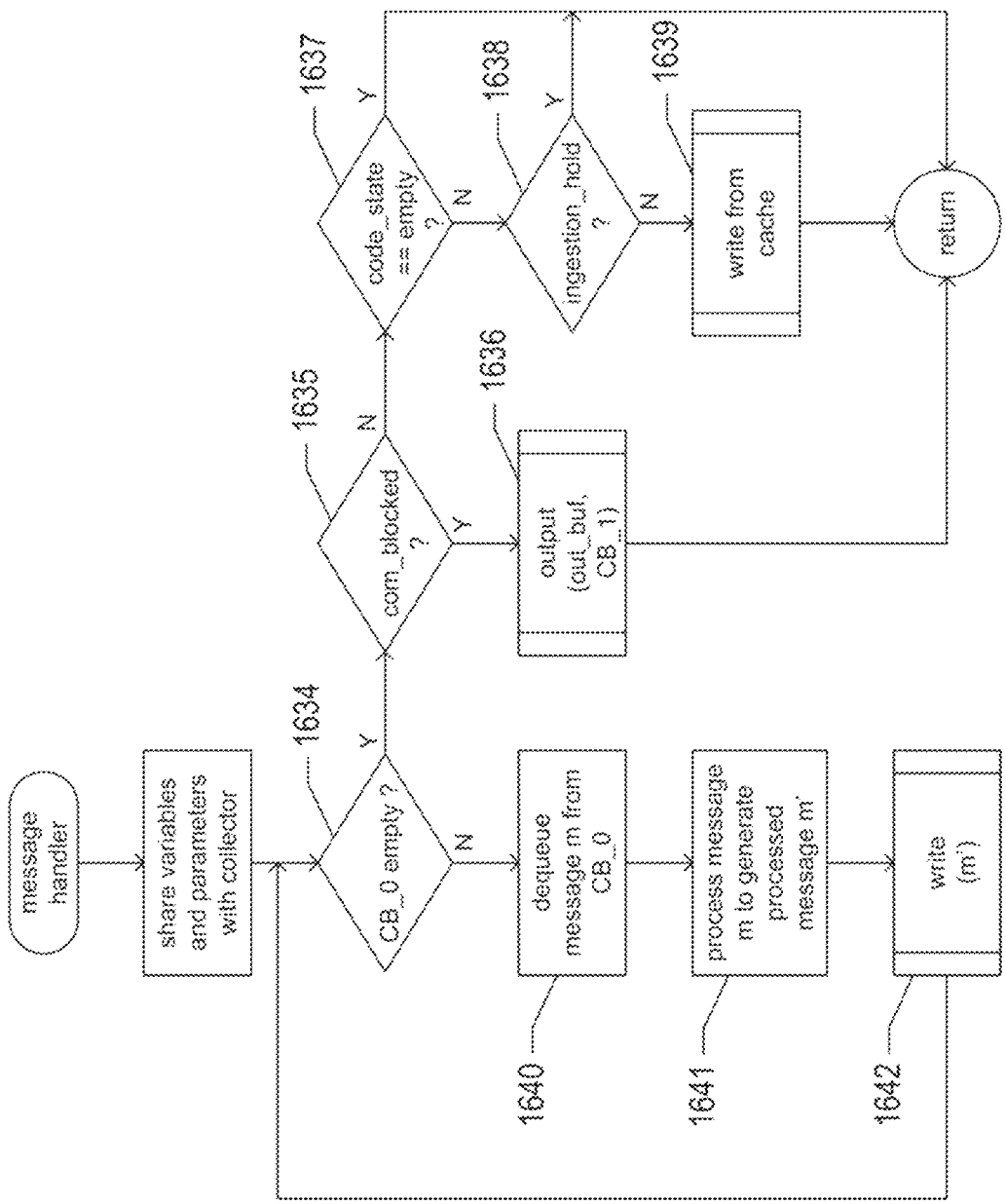

FIG. 16E provides a control-flow diagram for the routine message handler, called in step 1611 of FIG. 16A. In step 1634, the routine message handler determines whether or not the circular buffer CB_0 is empty. When circular buffer CB_0 is empty, and when communications are blocked, as determined in step 1635, the routine output is called, in step 1636, to again attempt to transfer the contents of the internal buffer pointed to by the buffer pointer out_buf to the network. When communications are blocked the local variable cache_state is not empty, as determined in step 1637, and the local variable ingestion_hold contains the value false, as determined in step 1638, the routine write from cache is called, in step 1639, to transfer data from the internal cache to the internal buffers for transmission to the message-ingestion-and-processing system. When the circular buffer CB_0 is not empty, as determined in step 1634, the loop of steps 1640-1642 and 1634 iterates to dequeue log/event messages from CB_0, carry out any processing of the dequeued messages, and forward the processed messages to either the internal buffers or to the internal cache via a call to the routine write, in step 1642. Completion of the loop of steps 1640-1642 and 1634 is followed by control flowing to step 1635, described above.

Figure 16F:
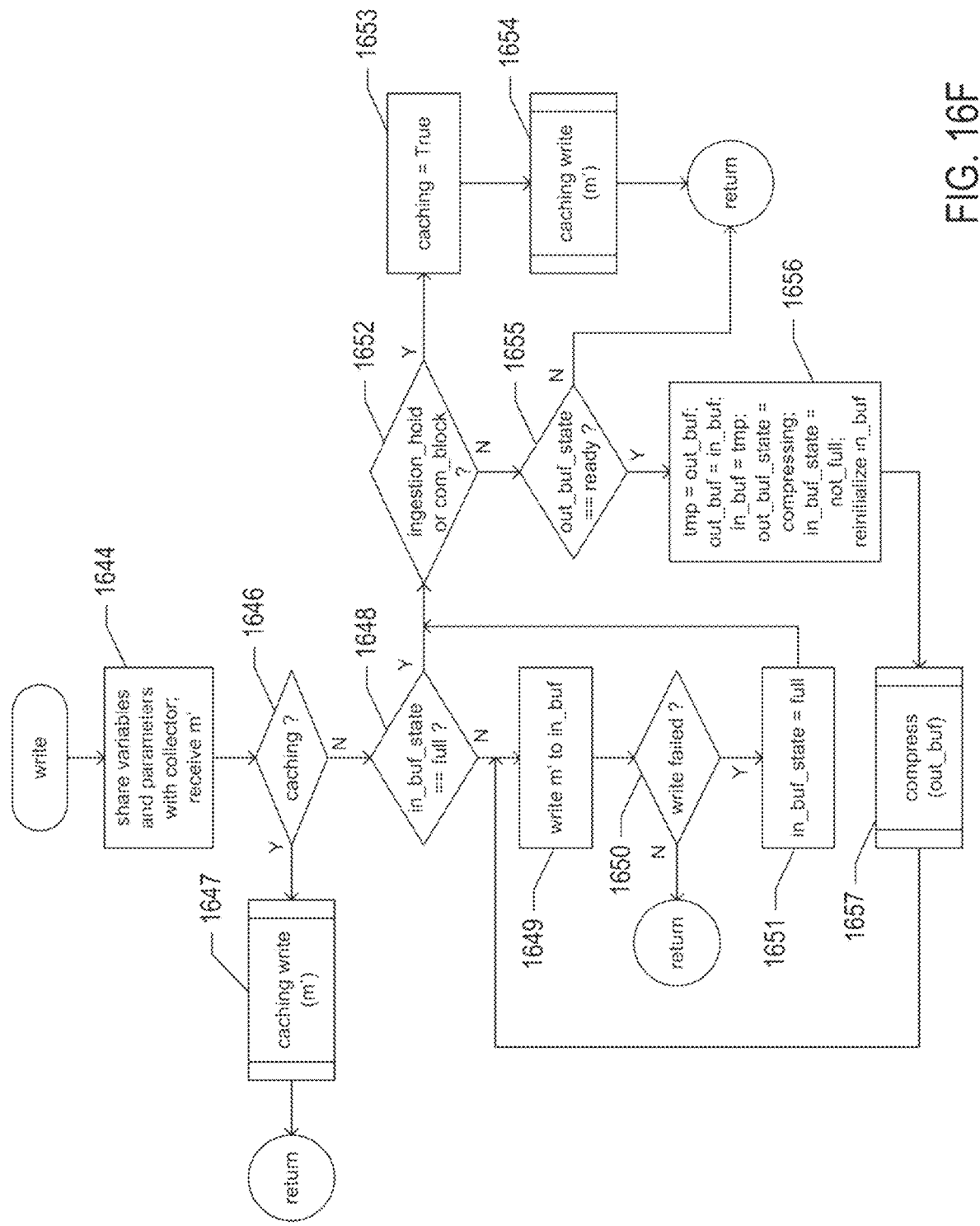

FIG. 16F provides a control-flow diagram for the routine write, called in step 1642 of FIG. 16E. In step 1644, the routine write receives a processed message m' to write to an internal buffer or to the internal cache. In step 1646, the routine write determines whether or not the message collector is currently caching processed log/event messages. When the message collector is caching processed log/event messages, the routine caching write is called, in step 1647, to write processed log/event message m' to the internal cache. When the message collector is not currently caching processed log/event messages and when the state of the internal buffer pointed to by the buffer pointer in_buf is not full, as determined in step 1648, the routine write writes the received processed log/event message to the internal buffer pointed to by the buffer pointer in_buf in step 1649. When the write succeeds, as determined in step 1650, the routine write terminates. Otherwise, the local variable in_buf_state is set to full, in step 1651, and control flows to step 1652. When processed log/event messages are currently not being forwarded to the message-ingestion-and-processing system, as determined in step 1652, the local variable caching is set to true, in step 1653, and the routine caching write is called, in step 1654, to write the received processed log/event message to the cache. Otherwise, when the internal buffer pointed to by the buffer pointer out_buf is in the state ready, as determined in step 1655, the buffer pointers in_buf and out_buf are inverted, the local variable out_buf_state is set to compressing, the local variable in_buf_state is set to not_full, and the internal buffer pointed to by the buffer pointer in_buf is reinitialized, in step 1656. The routine compress is then called, in step 1657, to compress the contents of the internal buffer pointed to by the buffer pointer out_buf and control flows to step 1649, where the received processed log/event message is written to the internal buffer pointed to by the buffer pointer in_buf.

Figure 16G:
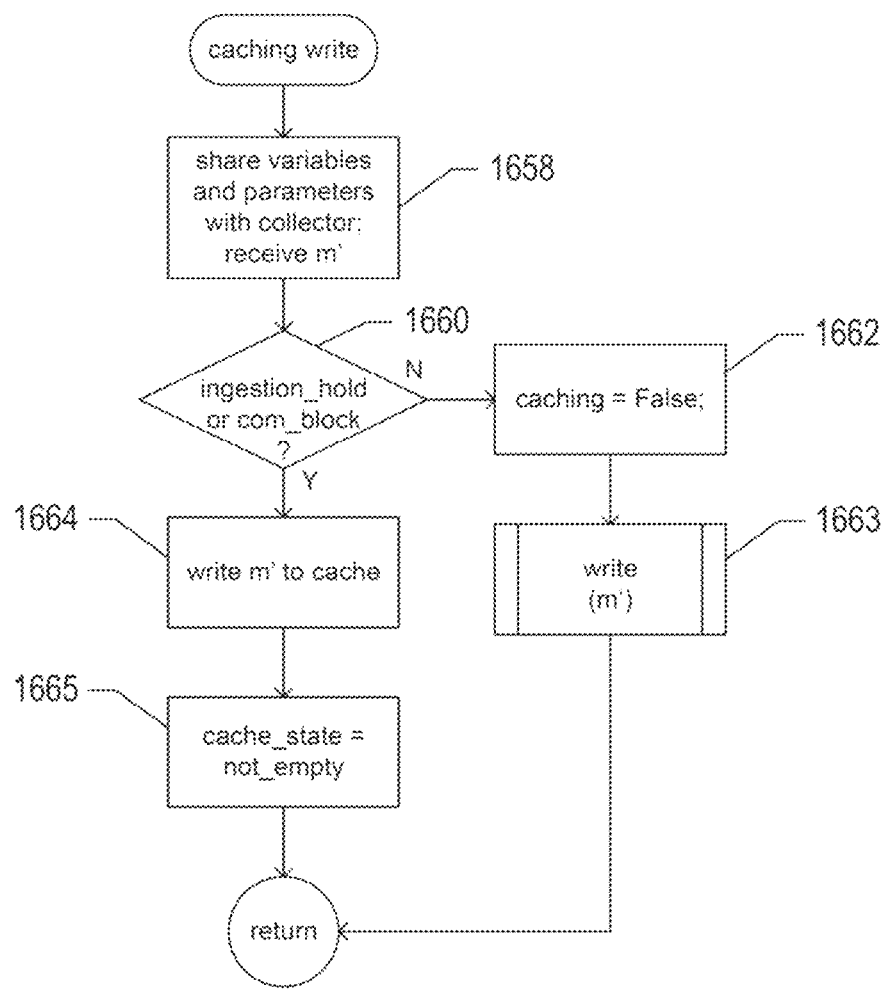

FIG. 16G provides a control-flow diagram for the routine caching write, called in steps 1647 and 1654 of FIG. 16F. In step 1658, the routine caching write receives a processed log/event message to write to the internal cache. When the message collector is currently forwarding processed log/event messages to the message-ingestion-and-processing system, as determined in step 1660, the local variable caching is set to false, in step 1662, and the routine write is called, in step 1663, to write the received processed log/event message to an internal buffer for transmission to the message-ingestion-and-processing system. When the message collector is currently caching processed log/event messages, the received processed log/event message is written to the cache, in step 1664 and, in step 1665, the local variable caching_state is set to not_empty. Note that, in this implementation, the cache is overwritten when filled, and thus previously cached messages are lost.

Figure 16H:
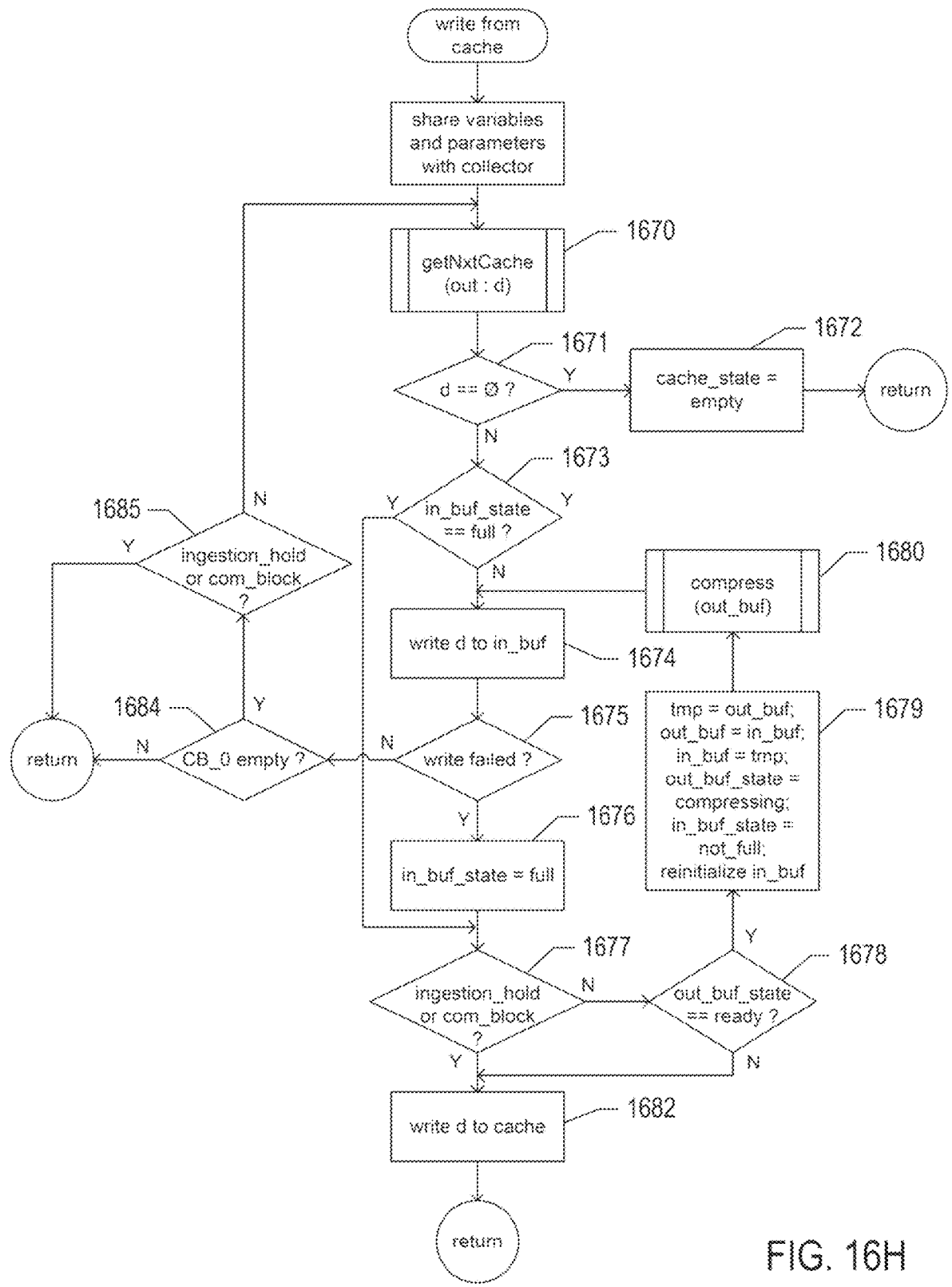

FIG. 16H provides a control-flow diagram for the routine write from cache, called in step 1639 of FIG. 16E. In step 1670, the routine write from cache calls a routine getNxtCache to retrieve a next data item d from the internal cache. When no data item is returned, as determined in step 1671, the local variable caching_state is set to empty, in step 1672, and the routine write from cache terminates. Otherwise, when the local variable in_buf_state does not contain the value full, as determined in step 1673, the retrieved data item is written to the internal buffer pointed to by the buffer pointer in_buf, in step 1674. When this write fails, as determined in step 1675, the local variable in_buf_state is set to full in step 1676. When the message collector is currently forwarding processed log/event messages to the message-ingestion-and-processing system, as determined in step 1677, and when the local variable out_buf_state contains the value ready, as determined in step 1678, the buffer pointers in_buf and out_buf are inverted, out_buf_state is set to compressing, in_buf_state is set to not_full, and the internal buffer pointed to by buffer pointer in_buf is reinitialized, in step 1679. The routine compress is then called, in step 1680, and control returns to step 1674. When the message collector is not forwarding processed log/event messages to the message-ingestion-and-processing system, as determined in step 1677, the data retried from the cache, d, is returned to the cache in step 1682. When the write of data item d to the internal buffer pointed to by the buffer pointer in_buf succeeds, as determined in step 1675, and when CB_0 remains empty, as determined in step 1684, then as long as the message collector is forwarding log/event messages to the message-ingestion-and-processing system, as determined in step 1685, control returns to step 1674 for retrieval of another data item from the internal cache.

Figure 17:
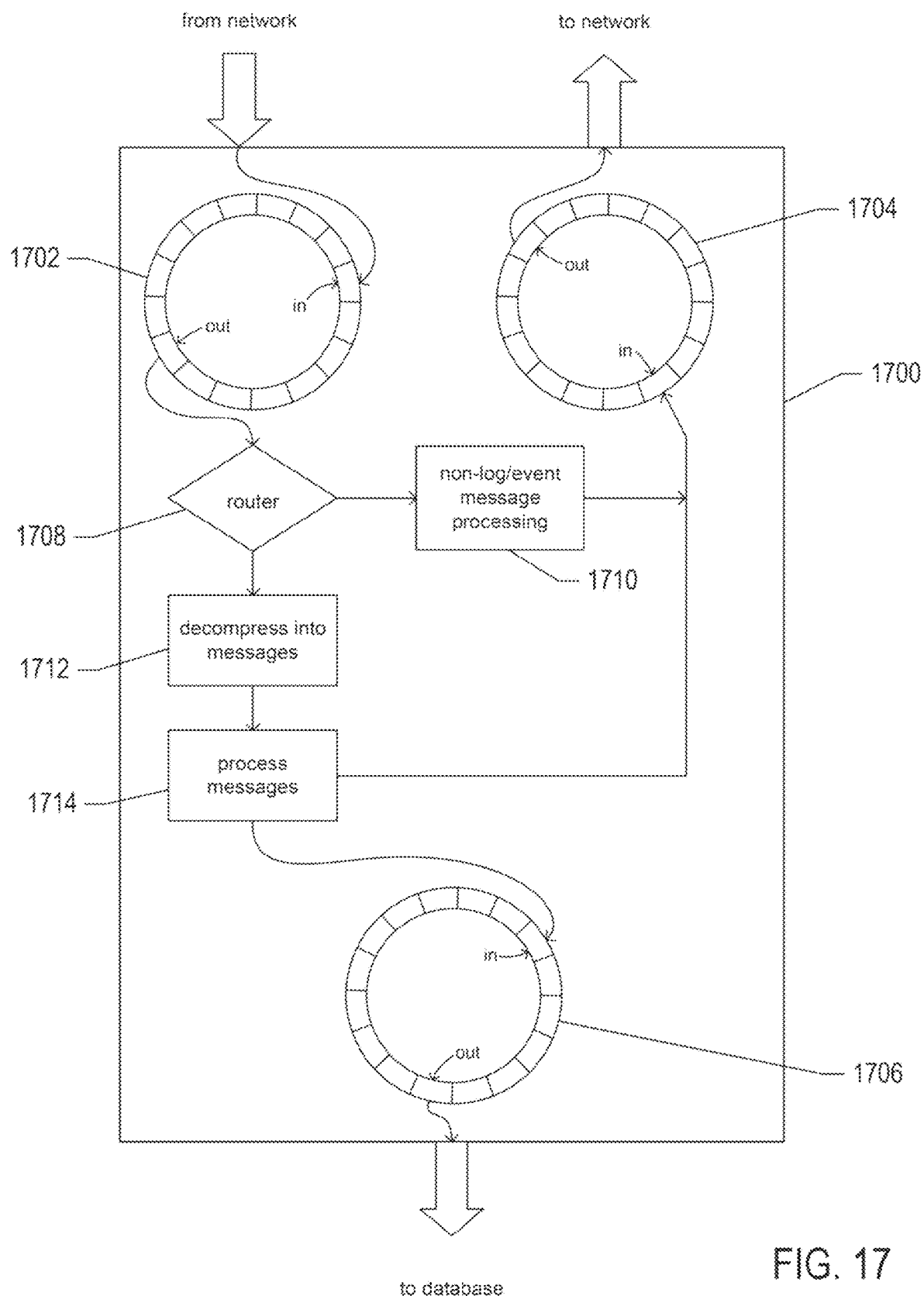
FIG. 17 illustrates a logical implementation of a message-ingestion-and-processing system, using illustration conventions similar to those used in FIG. 15.

FIG. 17 illustrates a logical implementation of a message-ingestion-and-processing system, using illustration conventions similar to those used in FIG. 15. In many implementations, the message-ingestion-and-processing system 1700 is implemented as an application running within the one or more virtual machines of one or more computer systems or running within execution environments provided by one or more operating systems of one or more computer systems. The message-ingestion-and-processing system connects with the network via an input circular queue 1702 and an output circular queue 1704. The message-ingestion-and-processing system queues processed messages to an output queue 1706 for storage in a log/event-message database. Messages are dequeued from input queue 1702 and initially fed through an internal router 1708 which forwards non-log/event messages to a processing component for such messages 1710 and forwards compressed and encrypted batches of log/event messages to a decryption and decompression component 1712. The decrypted and decompressed messages are processed by a log/event-message processing component 1714, which emits process messages for storage in the message database. The non-log/event messages may include various types of administration and management messages used to configure and control operation of the message-ingestion-and-processing system. Such messages generally follow a client/server type of protocol, with the message-ingestion-and-processing system responding to such messages by queuing responses to output circular buffer 1704. The message-processing component 1714 may carry out various types of processing functions, including filtering the messages so that only desired and relevant log/event messages are stored in the message database, recognizing critical messages for which alerts are generated and encoded in alert messages that are queued to the output queue 1704, normalizing message content for storage in the message database to facilitate subsequent query processing, and other such processing functions. The log/event message query system (1412 in FIG. 14) provides a query-based interface to the message database that allows administrators, managers, automated administration-and-management systems, and other users to extract specified types of log/event messages from the message database in order to facilitate various types of administration and management tasks. The log/event message query system is often implemented by a conventional database management system, such as a relational database management system, that may be configured with a variety of pre-constructed queries and stored routines to facilitate access to the message database.

The log/event-message system discussed above with reference to FIGS. 14-17 is able to tolerate short periods of time during which ingestion of messages by one or more of the message-ingestion-and-processing systems is substantially delayed or inoperable and/or during which network connections between message collectors and one or more of the message-ingestion-and-processing systems become saturated or inoperable. During these short periods of time, the message collectors internally cache log/event messages rather than forwarding the log/event messages to the message-ingestion-and-processing systems, as discussed above. However, as also discussed above, once storage space within the internal caches is exhausted, message collectors have no choice but to disregard subsequently received log/event messages or to continuously overwrite already cached log/event messages. In this case, important or critical information may be lost and the ability of automated distributed-computing-system administration-and-management subsystems to detect, diagnose, and ameliorate problems within distributed-computing systems is then compromised. The periods of time during which message collectors can internally cache log/event messages may be lengthened by increasing cache capacities, but, as discussed above, message collectors and other components of the distributed computing systems tend to be severely constrained by the large volumes of log/event messages that are continuously generated within distributed-computing systems, which, in turn, severely limits the ability of system designers to extend caching time periods by increasing the storage capacity of message-collector caches. To address these problems, the currently disclosed methods and systems combine internal caching with efficient cached-information compression, discussed below, that can extend periods of internal caching by message collectors by several orders of magnitude without significant data loss.

Figure 18:
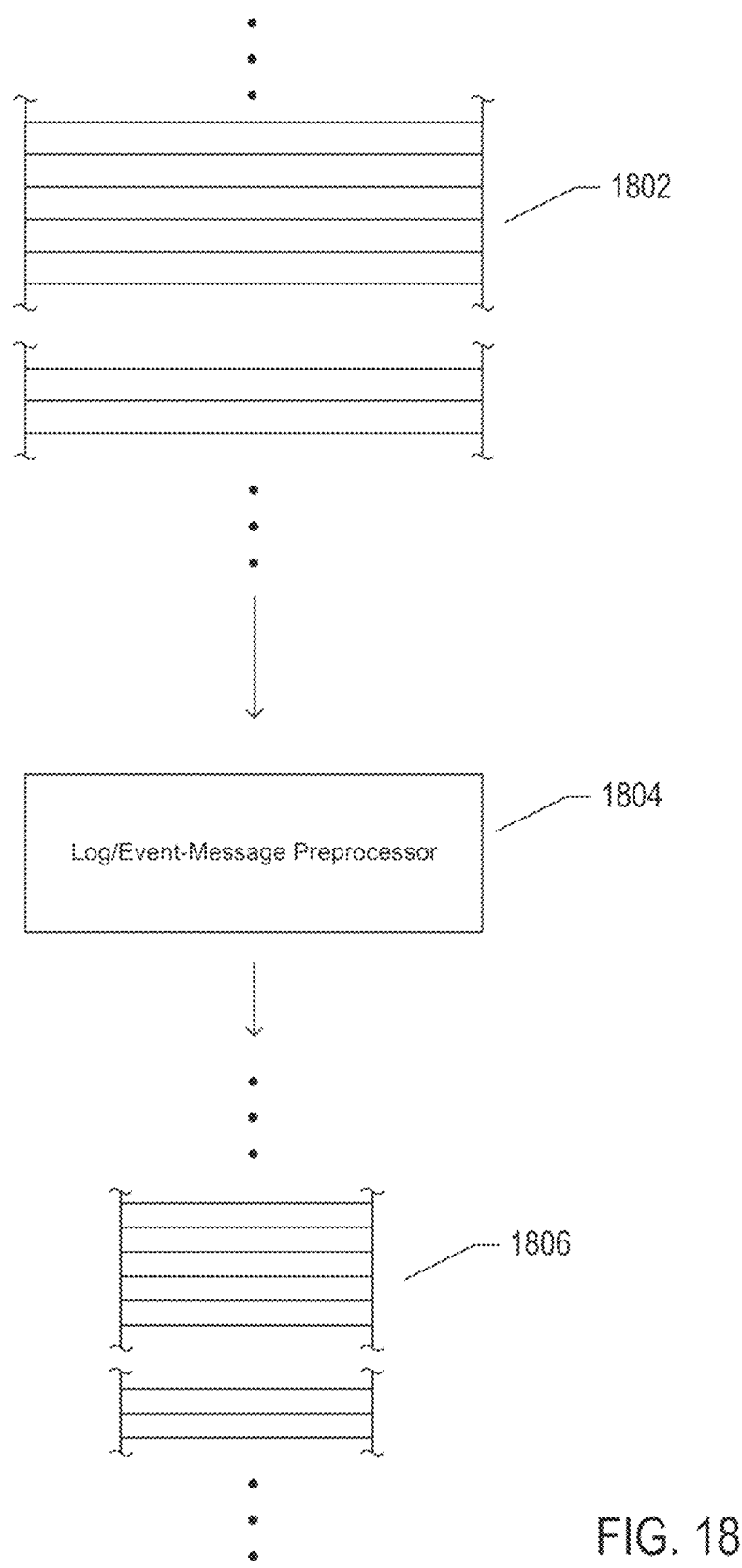
FIG. 18 illustrates log/event-message preprocessing that provides a basis for efficient cached-information compression.

FIG. 18 illustrates log/event-message preprocessing that provides a basis for efficient cached-information compression. As shown in FIG. 18, an input stream of log/event messages 1802 is preprocessed by a log/event-message preprocessor 1804 to generate an output stream 1806 of base-form log messages ("BFLMs"). A BFLM is a systematically transformed log/event message. In general, highly variable fields in input log/event messages are abbreviated or removed to produce a corresponding BFLM. However, variability is only one criterion for field removal or abbreviation. In general, the transformations of log/event messages to corresponding BFLMs is designed or obtained by automated methods to minimize the number of unique BFLMs while, at the same time, maximizing subsequent desired information recovery from stored information compiled from collected BFLM statistics. Thus, transformations of log/event messages to corresponding BFLMs are dependent on the types of information extracted from stored information by the log/event message query system. The number of unique BFLMs in the output stream 1806 is generally far less than the number of unique input log/event messages. For example, input log/event messages generally include timestamps, so that only those log/event messages generated within the smallest-granularity time that can represented by a timestamp have any chance of being identical. However, when the timestamp is removed or replaced by a common symbol, then log/event messages generated at any time may be identical. A BFLM can serve as a log/event-message identifier for efficient compression of log/event messages, as discussed below.

Figure 19:
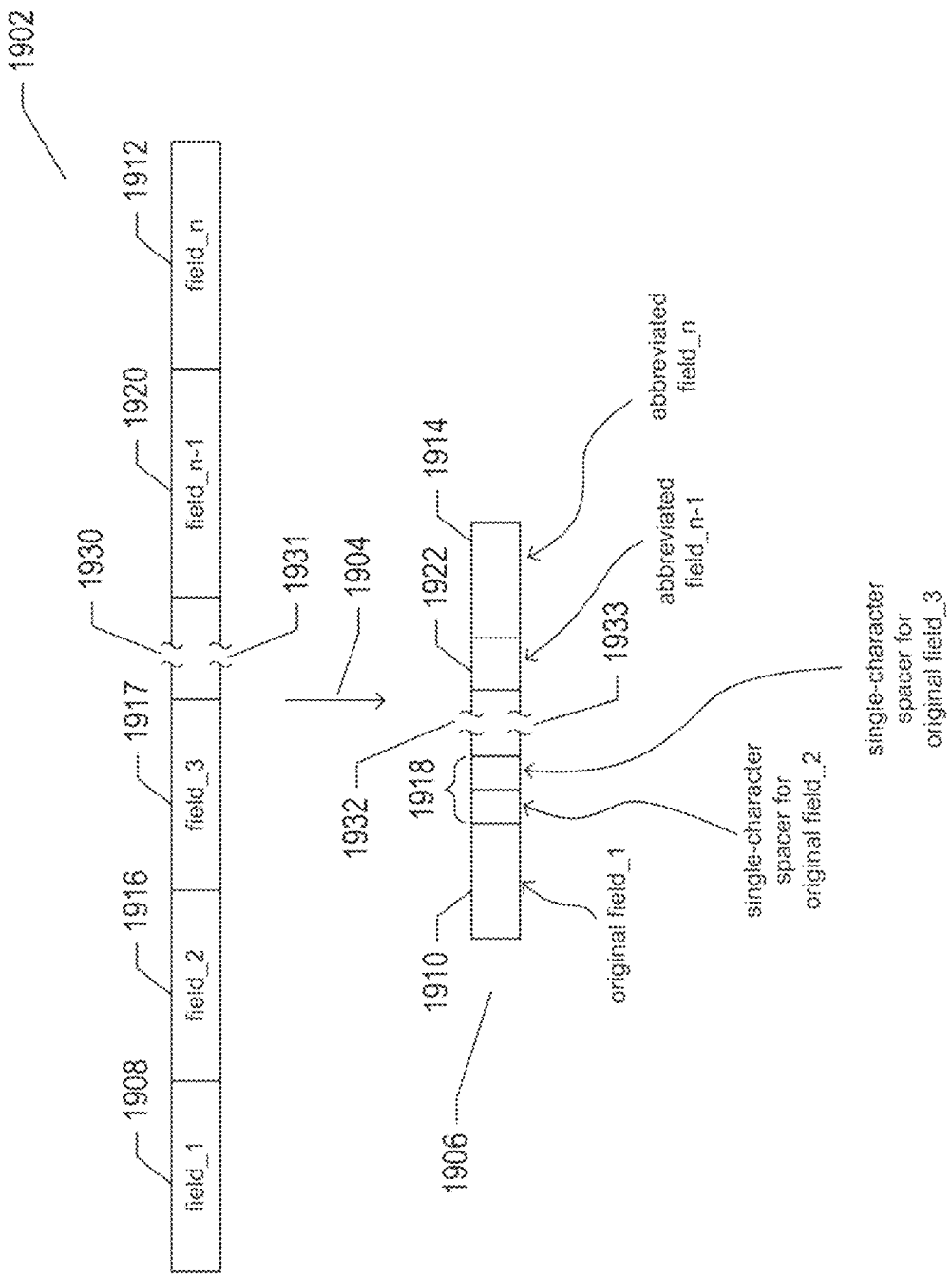
FIG. 19 illustrates log/event-message preprocessing.

FIG. 19 illustrates log/event-message preprocessing. An input log/event message 1902 is represented at the top of the figure. Arrow 1904 represents preprocessing. The result of preprocessing, BFLM 1906, is a generally truncated version of the input log/event message. In this example, the first field 1908 in the input log/event message remains intact 1910 in the BFLM. Similarly, the final field 1912 of the input log/event message remains intact 1914 in the BFLM. However, the second and third fields of the input message 1916-1917 are both abbreviated to single-character spacers 1918 in the BFLM, essentially removing these fields. The second to last field 1920 in the input log/event message is abbreviated 1922 in the output BFLM. Note that, in this figure and subsequent figures, broken lines 1930-1933 indicate the possible presence of additional fields in both representations of log/event messages as well as BFLMs. In general, there are a variety of different transformations that can be carried out on each original field of the input log/event message. The field can be incorporated in the BFLM, truncated and incorporated in the BFLM, abbreviated incorporated in the BFLM, compressed and incorporated in the BFLM, mapped to one of a set of replacement fields, with the replacement field incorporated in the BFLM, and omitted from the BFLM.

There are many different possible ways to generate systematic log/event-message preprocessors. The transformations, such as the transformation shown in FIG. 19, may be hardcoded or specified through a user interface by system administrators and other personnel. Alternatively, machine-learning techniques may be applied to optimize compression by learning which fields to remove or abbreviate to maximize compression while minimizing information loss. Users may employ additional information, including log-content packs provided by application and log-message-system vendors, to rationally determine the types of transformations that provide desired levels of compression without significant information loss.

Figure 20B:
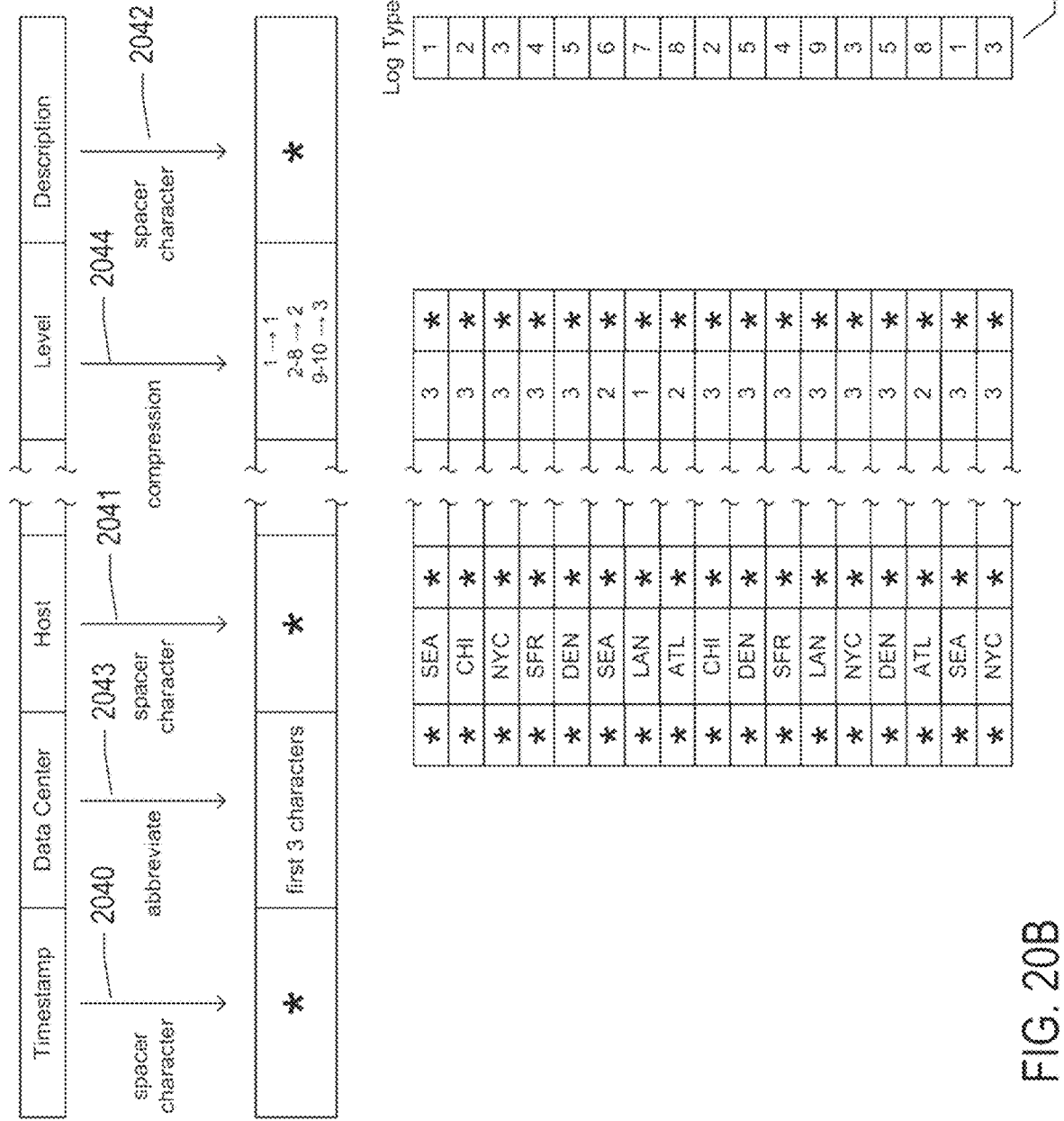
Figure 20C:
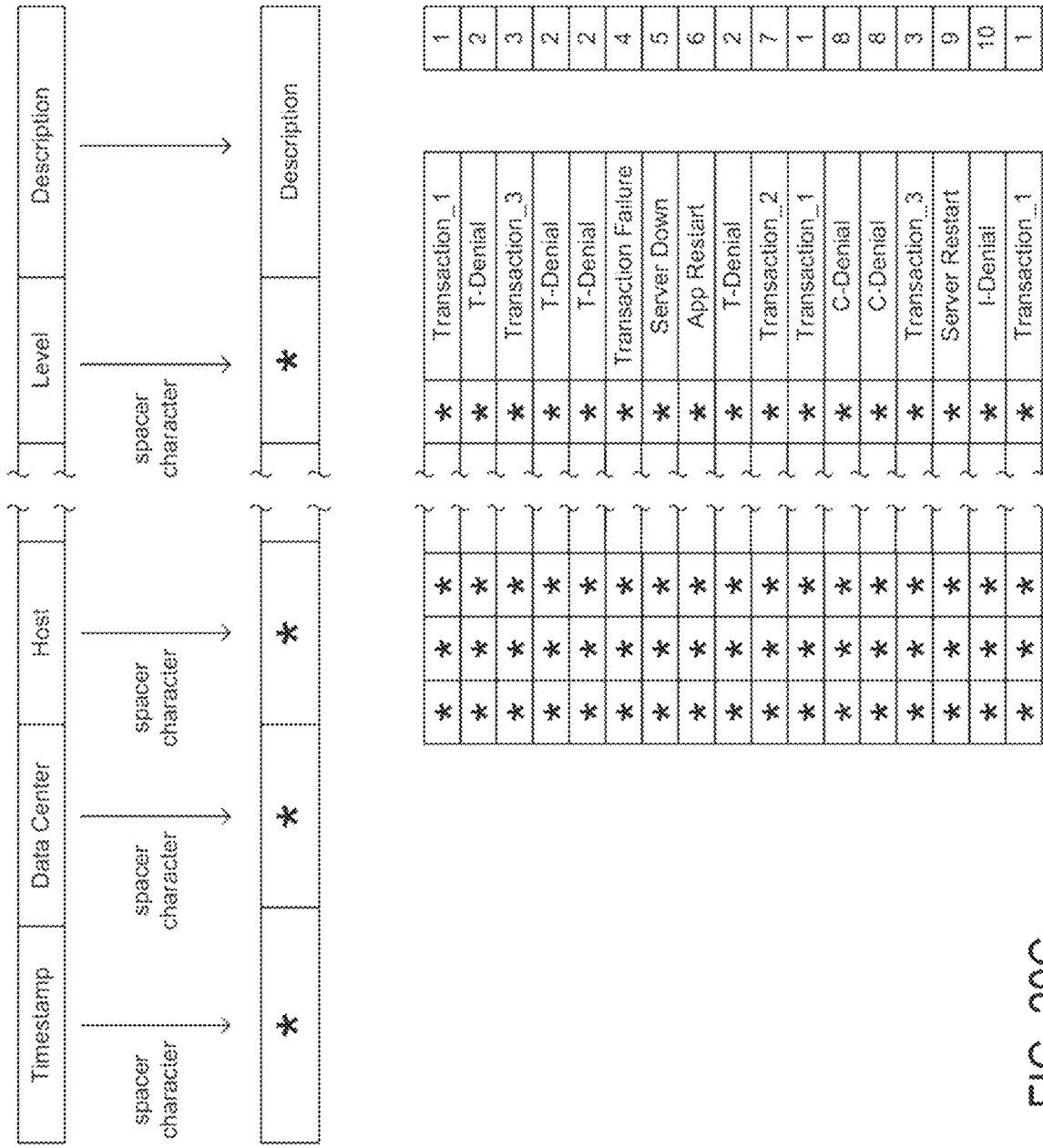

FIGS. 20A-C provide several examples of log/event-message-to-BFLM transformations. FIG. 20A shows a representation 2002 of a log/event message which includes the fields: (1) Timestamp 2003; (2) Data Center 2004; (3) Host 2005; (4) Level 2006; and (5) Description 2007. Table 2008 includes 17 log/event messages, with each row of the table representing a single log/event message. For example, a log/event message query system might store log/event messages in a relational-database table with columns corresponding to the log/event-message fields. FIG. 20B shows a first log/event-message-to-BFLM transformation and a table containing the 17 BFLMs produced by the transformation corresponding to the 17 log/event-messages shown in table 2008 in FIG. 20A. The first log/event-message-to-BFLM transformation substitutes a spacer character for the first, third, and final fields 2040-2042, abbreviates the second field using the first three characters of the original second field 2043, and compresses the second-to-last field 2044 by compressing 100 different possible levels that may be encoded in the Level field to only three levels. As indicated by a log-type column 2046, following transformation, the 17 different log/event messages are transformed into only nine different BFLMs. Of course, in an actual log/event-message system, this type of transformation may lead to compression of literally billions of different log/event messages to only a few tens to hundreds of different types of BFLMs. FIG. 20C illustrates a different, second log/event-message-to-BFLM transformation, using the same illustration conventions as used in FIG. 20B. In this case, the 17 different log/event messages, shown in FIG. 20A, are compressed into 10 different types of BFLM. As with the first log/event-message-to-BFLM transformation, application of the second log/event-message-to-BFLM transformation to a real-world set of billions of log/event messages may result in compression of literally billions of different log/event messages to only a few tens to hundreds of different types of BFLMs. Thus, log/event-message preprocessing is used to produce a modest number of unique BFLMs corresponding to a very large number of different types of log/event messages. In general, the ratio of unique BFLMs to unique log/event-messages is less than 0.001, is frequently less than 0.000001, and can often be significantly smaller. In many cases, a log/event-message system may employ multiple different transformations, each applied to a particular subset of log/event messages. In other words, a particular transformation may be used for each of a number of different fundamental types of log/event messages.

FIGS. 21A-C illustrate one approach to extracting fields from a log/event message. Log/event messages may be understood as containing discrete fields, as in the representations shown in FIGS. 19-20A, but, in practice, they are generally alphanumeric character strings. An example log/event message 2102 is shown at the top of FIG. 21A. The five different fields within the log/event message are indicated by labels, such as the label "timestamp" 2104, shown below the log/event message. FIG. 21B includes a variety of labeled regular expressions that are used, as discussed below with reference to FIG. 21C, to extract the values of the discrete fields in log/event message 2102. For example, regular expression 2106 follows the label YEAR 2108. When this regular expression is applied to a character string, it matches either a four-digit indication of a year, such as "2020," or a two-digit indication of the year, such as "20." The string "\d\d" matches two consecutive digits. The "(?>" and ")" characters surrounding the string "\d\d" indicates an atomic group that prevents unwanted matches to pairs of digits within strings of digits of length greater than two. The string "{1, 2}" indicates that the regular expression matches either one or two occurrences of a pair of digits. A labeled regular expression can be included in a different regular expression using a preceding string "%{"and a following symbol"}," as used to include the labeled regular expression MINUTE (2110 in FIG. 21B) in the labeled regular expression TIMESTAMP_ISO8601 (2112 in FIG. 21B). There is extensive documentation available for the various elements of regular expressions.

Grok parsing uses regular expressions to extract fields from log/event messages. The popular Logstash software tool uses grok parsing to extract fields from log/event messages and encode the fields according to various different desired formats. For example, as shown in FIG. 21C, the call to the grok parser 2120 is used to apply the quoted regular-expression pattern 2122 to a log/event message with a format of the log/event message 2102 shown in FIG. 21A, producing a formatted indication of the contents of the fields 2124. Regular-expression patterns for the various different types of log/event messages can be developed to identify and extract fields from the log/event messages input to message collectors. When the grok parser unsuccessfully attempts to apply a regular-expression pattern to a log/event message, an error indication is returned. The Logstash tool also provides functionalities for transforming input log/event messages into BFLMs, as discussed above with reference to FIG. 19-20C. The regular-expression patterns, as mentioned above, can be specified by log/event-message-system users, such as administrative personnel, can be generated by user interfaces manipulated by log/event-message-system users, or may be automatically generated by machine-learning-based systems that automatically develop efficient compression methods based on analysis of log/event-message streams.

Figure 22A:
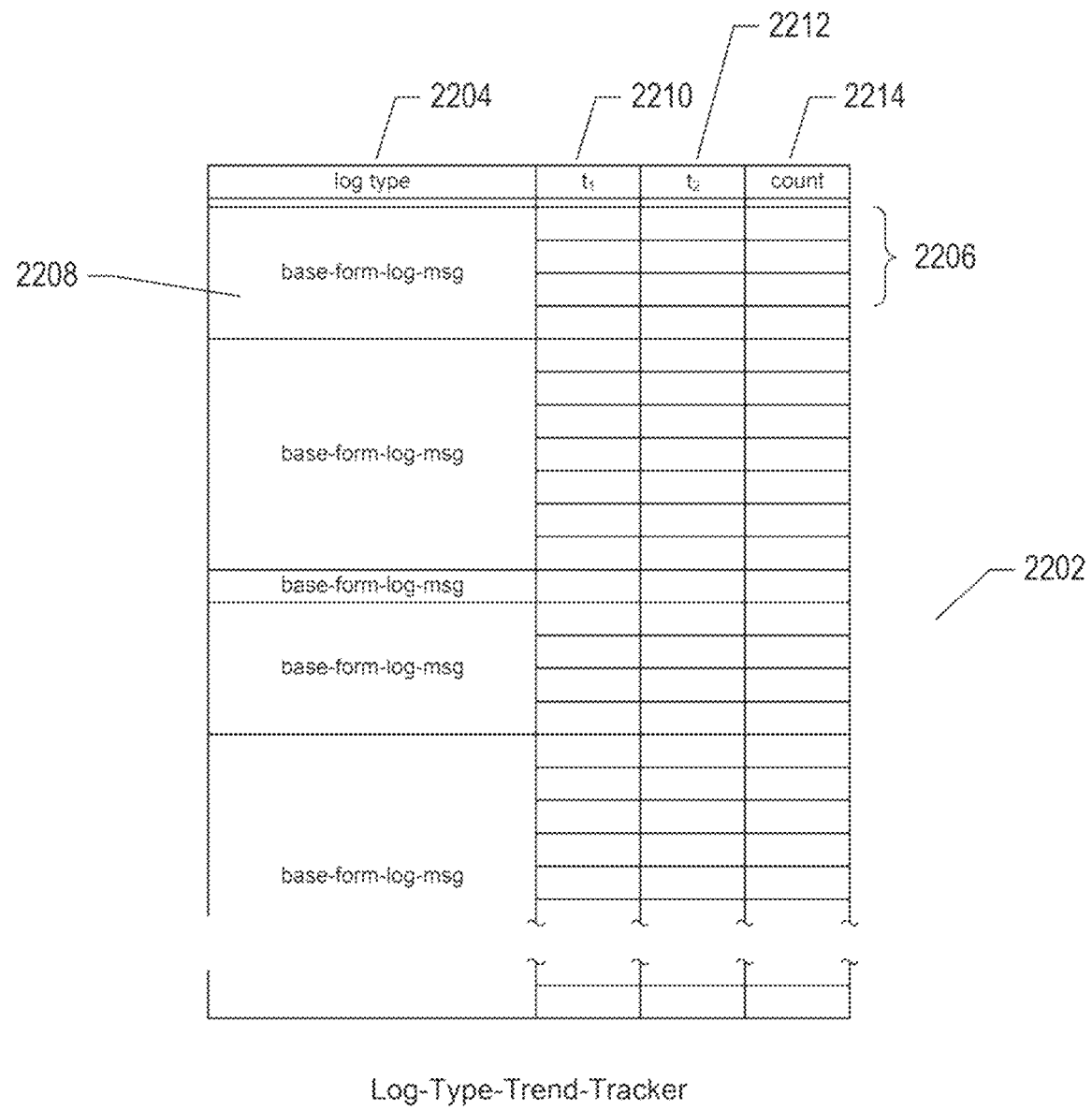

FIGS. 22A-B illustrate logical tables used to accumulate information, in compressed form, compiled by the currently disclosed efficient caching methods from log/event messages received by message collectors during message-forwarding interruptions. FIG. 22A shows a log-type-trend-tracker table 2202. A first column 2204 stores a BFLM for each type of log/event message received by a message collector during periods of time in which the message collector caches received the log/event messages rather than forwarding the received log/event messages to a messageingestion-and-processing system. Each unique BFLM in column 2204 is associated with one or more time-interval rows, such as the three time-interval rows 2206 associated with the first BFLM 2208. Each time-interval row represents a time period between and including a first timestamp, in column 2210, and a second timestamp, in column 2212, of the log-type-trend-tracker table. Note that the intersection of a column and a row represents a field in the table entry corresponding to the row. In the log-type-trend-tracker table, the three rows 2206 can be thought of as three entries sharing a common initial field 2208. The final column 2214 of each row contains the count of the log/event messages, received by the message collector during the time interval, which have been transformed to the BFLM contained in the first field of the row. The time interval used for the log-type-trend-tracker table is generally relatively short, on the order of a few seconds to a few tens of seconds. By transforming a stream of received log/event messages into the contents of a log-type-trend-tracker table, the message collector is able to obtain an large, favorable compression ratio with respect to the volume of data represented by the stream of received log/event messages. Only a single BFLM is stored for all of the received log/event messages of a particular type, along with two timestamps and an integer count for each time interval. Even the fact that only two timestamps are stored for each time interval per log/event-message type, rather than storing a timestamp in each log/event message, can represent a significant degree of compression. Moreover, only BFLMs corresponding to log/event-message types actually received during a caching period are stored.

An additional level of compression is obtained by reducing the log-type-trend-tracker table to a distribution-summary table. FIG. 22B shows an example of a distribution-summary table 2220. The distribution-summary table has a similar organization and format to the log-type-trend-tracker table, but includes three additional columns 2222-2224 and generally uses a longer time interval, on the order of tens of seconds to minutes. The three additional columns represent the minimum count, maximum count, and standard deviation of the counts in all of the short-time-interval rows of the log-type-trend-tracker table that are coalesced into a single longer-time-interval row of the distribution-summary table. These additional statistical values allow for various types of statistical inference with respect to the higher-resolution data within the log-type-trend-tracker table that is further compressed to generate the lower-resolution data stored in the distribution-summary table. Of course, in various different implementations, the log-type-trend-tracker table and distribution-summary table may include additional columns that store additional types of information. In some implementations, the log-type-trend-tracker table or tables may be compressed into one or more distribution-summary tables at the end of a caching period, before the message collector transmits the cached information to the message-ingestion-and-processing system. In other implementations, including the implementation next discussed, log-type-trend-tracker-table time-interval rows are coalesced into distribution-summary-table time-interval rows as soon as possible, on an ongoing basis. These implementations provide for more efficient compression and thus provide longer caching periods.

Figure 23A:
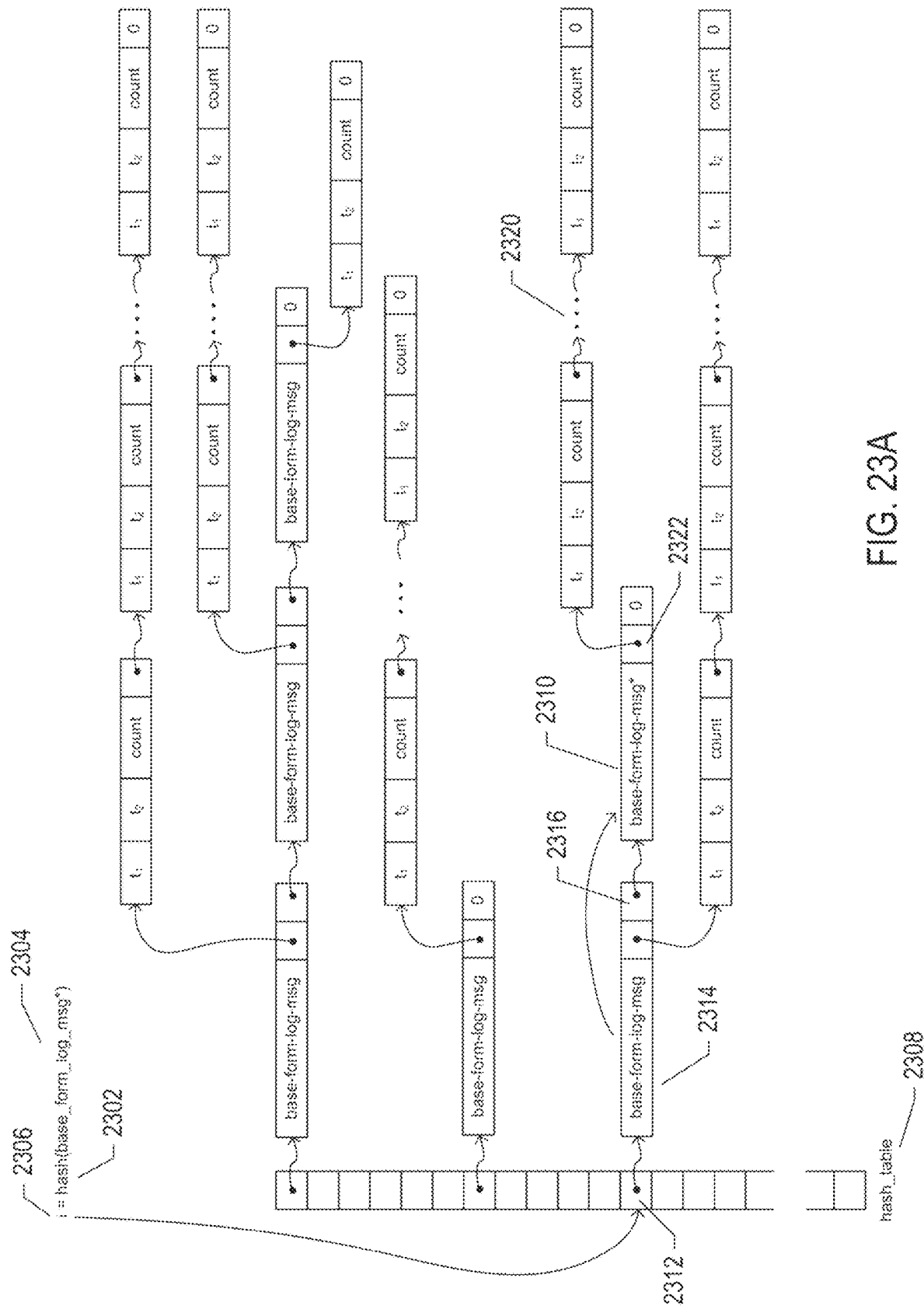
FIGS. 23A-B illustrate a hash-table-based implementation of the above-discussed log-type-trend-tracker and distribution-summary tables.
Figure 23B:
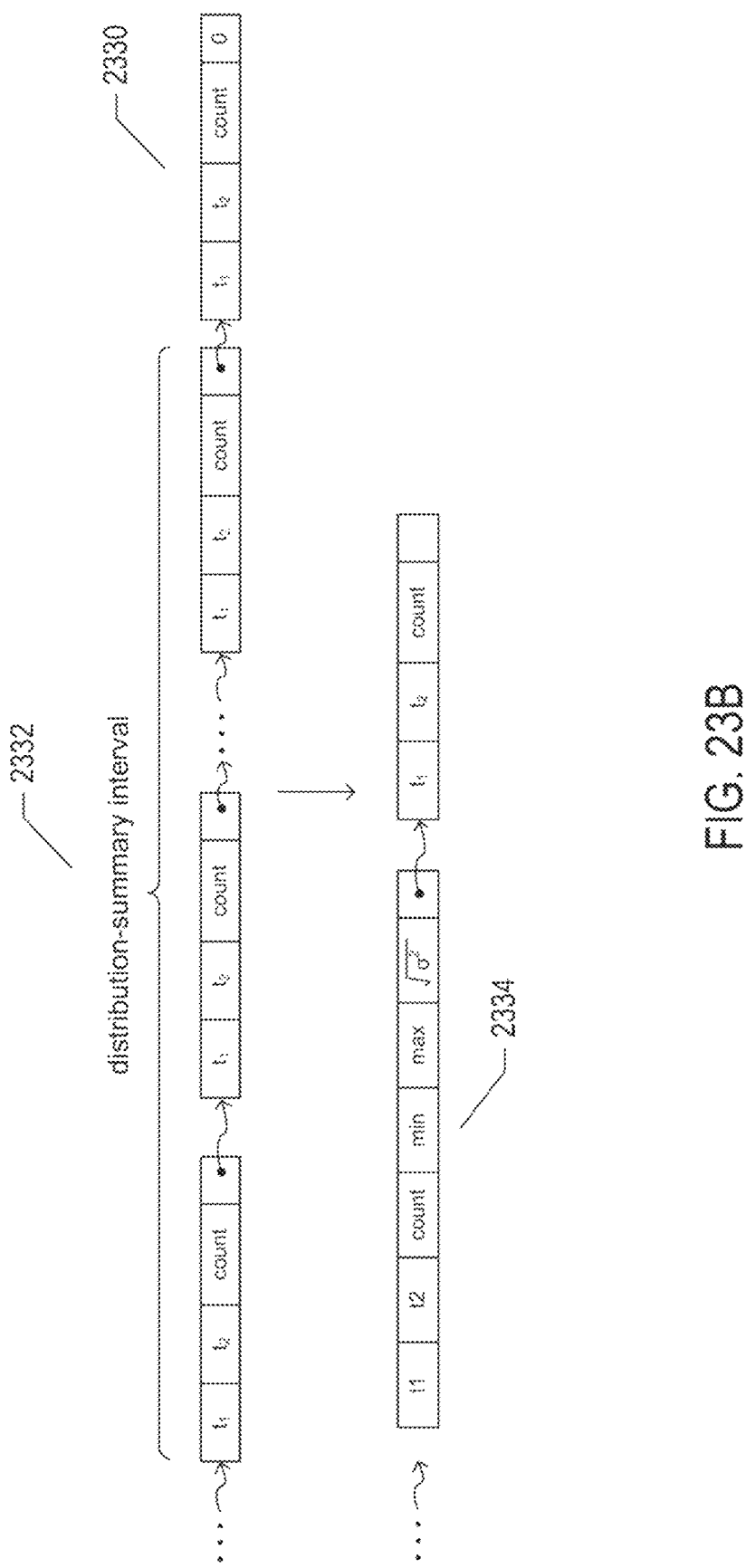

FIGS. 23A-B illustrate a hash-table-based implementation of the above-discussed log-type-trend-tracker and distribution-summary tables. As shown in FIG. 23A, a hash function 2302 is applied to a BFLM 2304 to generate an index i 2306 that identifies a cell in a hash table 2308 containing a pointer to a list of BFLM entries, each BFLM entry including a pointer to a list of time-interval-row entries. An asterisk is appended to the BFLM 2104 in FIG. 23A to indicate a particular BFLM. The particular BFLM is contained in BFLM entry 2310. To find the entry for the particular BFLM, the particular BFLM is hashed to generate index i 2306, which is then used to identify cell 2312 in hash table 2308. A pointer in cell 2312 points to the first BFLM entry 2314 in a list of BFLM entries that contains a BFLM different from the particular BFLM. Therefore, a next-entry pointer 2316 in the first BFLM entry 2314 is accessed to find the next, or second, BFLM entry in the list. The second BFLM entry 2310 contains the particular BFLM. A time-interval-row-entry list 2320 for the particular BFLM is referenced by a time-interval-row-entry-list pointer 2322 within the BFLM entry 2310. Each time-interval-row entry in the time-interval-row-entry list represents either a row in the log-type-trend-tracker table or a row in the distribution-summary table.

As shown in FIG. 23B, as additional time-interval-row entries are added to a time-interval-row-entry list 2330, the time-interval-row-entry list will eventually contain one more than the number of log-type-trend-tracker-table time-interval-row entries 2332 that are coalesced to generate each distribution-summary-table time-interval-row entry. At this point, the initial set of log-type-trend-tracker-table time-interval-row entries in the list 2332, which correspond to a distribution-summary interval, are replaced by a corresponding distribution-summary-table time-interval-row entry 2334. Thus, a time-interval-row-entry list eventually contains one or more distribution-summary-interval entries followed by only a small number of log-type-trend-tracker-table entries at the end of the list. By continuously compressing log-type-trend-tracker-table time-interval-row entries into distribution-summary-table time-interval-row entries, the information cached by a message collector is most efficiently stored.

Figure 24A:
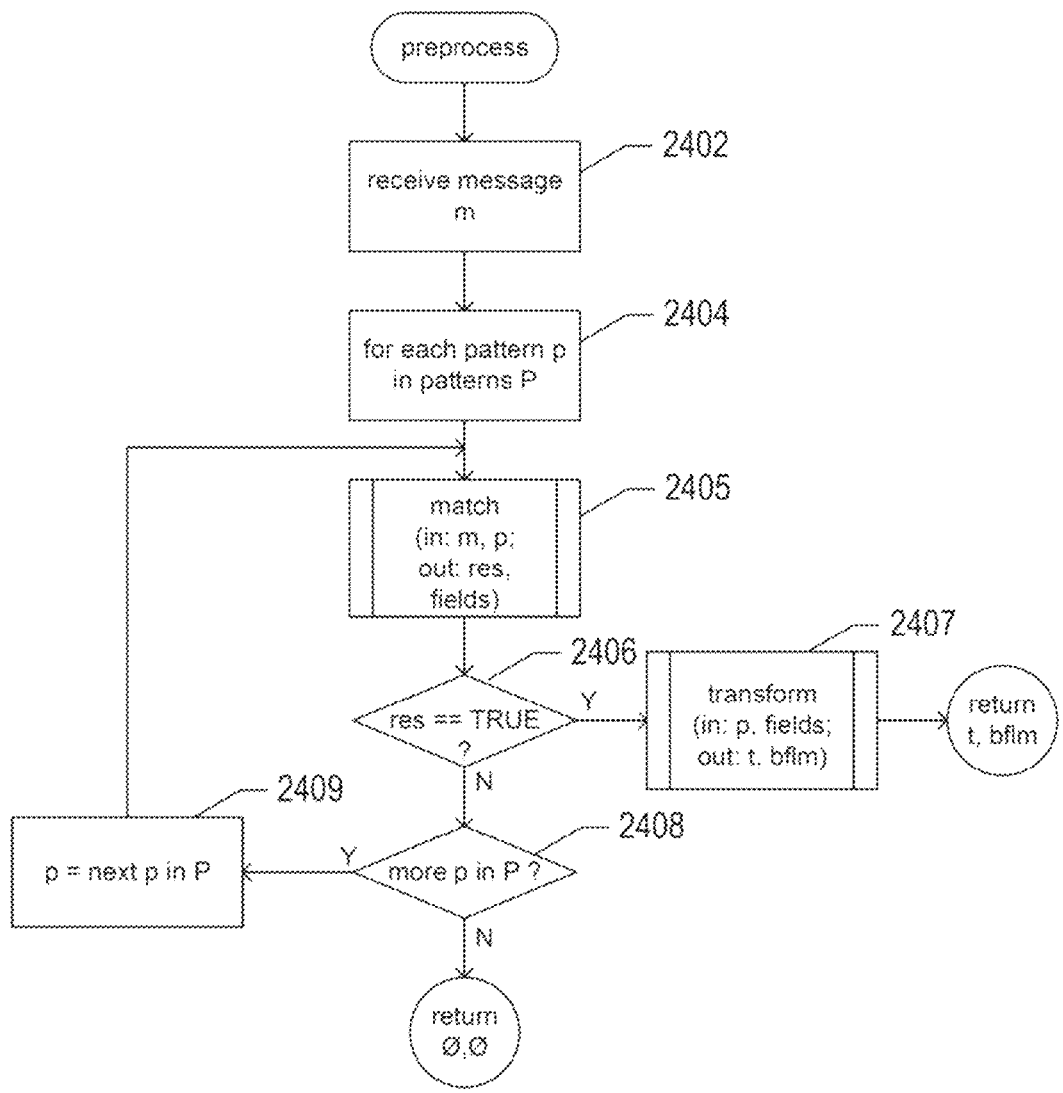
FIGS. 24A-D provide control-flow diagrams that illustrate one implementation of the currently disclosed methods and systems for efficient caching of information derived from log/event-messages by message collectors during network failures and message-ingestion interruptions.

FIGS. 24A-D provide control-flow diagrams that illustrate one implementation of the currently disclosed methods and systems for efficient caching of information derived from log/event-messages by message collectors during network failures and message-ingestion interruptions. FIG. 24A provides a control-flow diagram for a routine preprocess which preprocessors a log/event message to generate a corresponding timestamp/BFLM pair. In step 2402, the routine preprocess receives a log/event message m. In the for-loop of steps 2404-2409, the routine preprocess applies each regular-expression pattern p in a set of patterns P to the received log/event message m. In step 2405, a routine match is called to apply a next regular-expression pattern p to log/event message m. If the next regular-expression pattern p matches log/event message m, the routine match returns the result true, as determined in step 2406, and a routine transform is called, in step 2407, to transform the fields extracted from the log/event message m to a corresponding BFLM. The routine preprocess then returns a timestamp extracted from the log/event message m as well as the BFLM. Otherwise, when there are more regular-expression patterns p in a set of patterns P, as determined in step 2408, a next regular-expression pattern p is extracted from the set of patterns P, in step 2409, and control flows back to step 2405 for another iteration of the for-loop of steps 2404-2409. When there are no more patterns p in the set of patterns P, the routine preprocess returns null values.

Figure 24B:
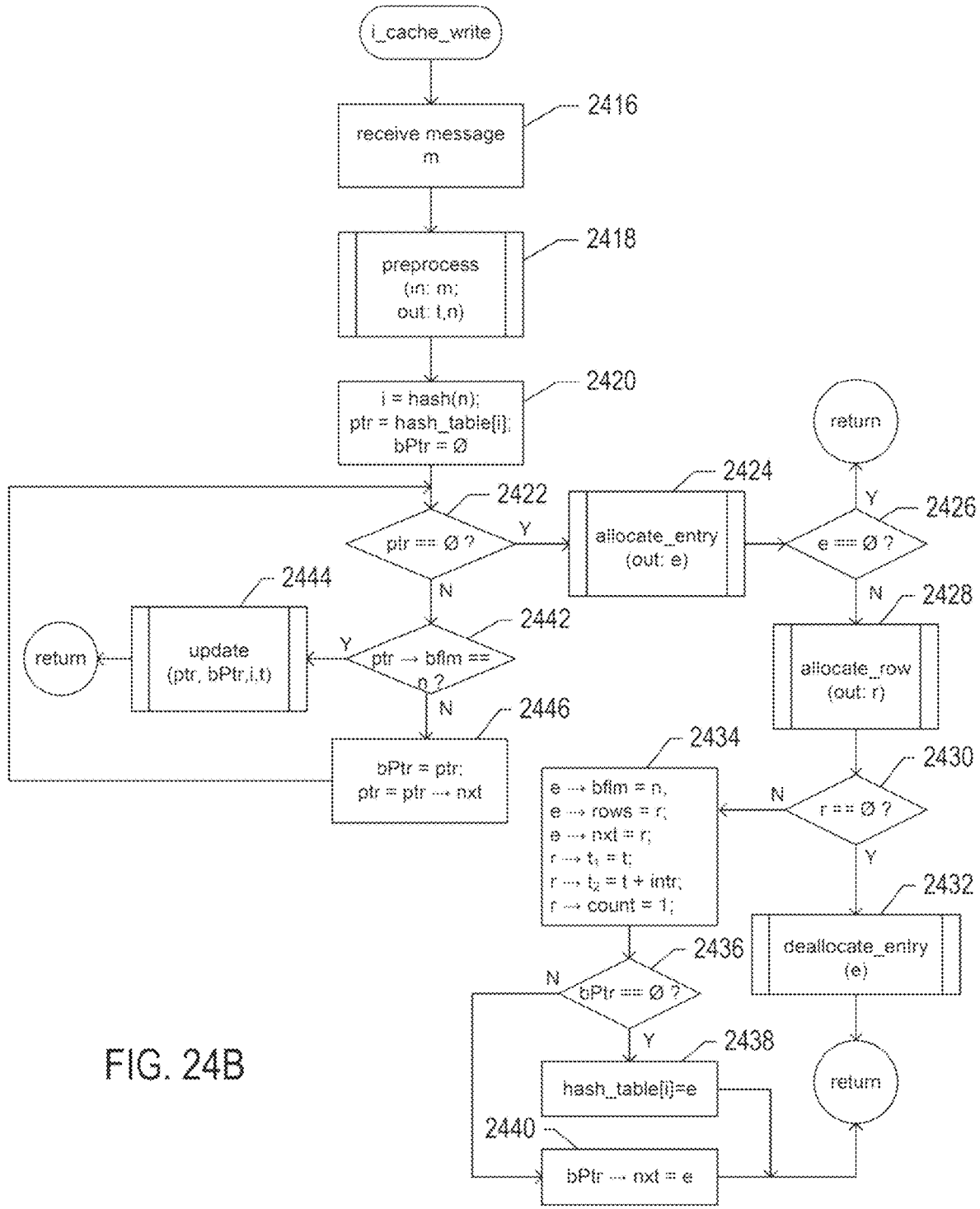

FIG. 24B provides a control-flow diagram for a routine i_cache_write, which stands for "intelligent_cache_write." This routine replaces the cache writes in steps 1664 and 1682 of FIGS. 16G-H in order to employ intelligent, compression caching in the message-collector implementation discussed with reference to FIGS. 15-16H. In step 2416, the routine i_cache_write receives a log/event message m. In step 2418, the routine i_cache_write calls the routine pre-process to transform the log/event message m into a timestamp t and a corresponding BFLM n. In step 2420, the routine i_cache_write hashes BFLM n to obtain an index i and uses the index to obtain a pointer ptr to the BFLM-entry list that should contain BFLM n. Another pointer variable bPtr is set to null. When ptr is null, as determined in step 2422, a new BFLM entry is allocated, in step 2424. If the allocation fails, as determined in step 2426, the routine i_cache_write returns without writing information about the received message m to the internal cache. The routine allocate_entry allocates entries from internal-cache memory. When internal-cache memory that memory is exhausted, the allocation fails, and message collector drops the received log/event message. When the allocation is successful, the routine i_cache_write allocates a new time-interval-row entry in step 2428. If this allocation fails, as determined in step 2430, then the BFLM entry allocated in step 2424 is deallocated in step 2432 and the routine i_cache_write terminates without writing information about the received message to the internal cache. When both allocations are successful, information about the received log/event message m is stored in the BFLM entry and time-interval-row entry, in step 2434. When bPtr is null, as determined in step 2436, the hash-table cell indexed by index i is set to point to the newly allocated BFLM entry in step 2438. Otherwise, the next pointer in the BFLM entry pointed to by bPtr is set to point to the newly allocated BFLM entry, in step 2440, adding the new BFLM entry to the end of an existing list. Returning to step 2422, when ptr is not null, and when the BFLM entry pointed to by ptr contains BFLM n, as determined in step 2442, a routine update is called, in step 2444, to store information related to the received log/event message m. Otherwise, in step 2446, bPtr is set to the contents of ptr and ptr is set to point to the BFLM entry pointed to by the BFLM entry currently pointed to by ptr.

Figure 24C:
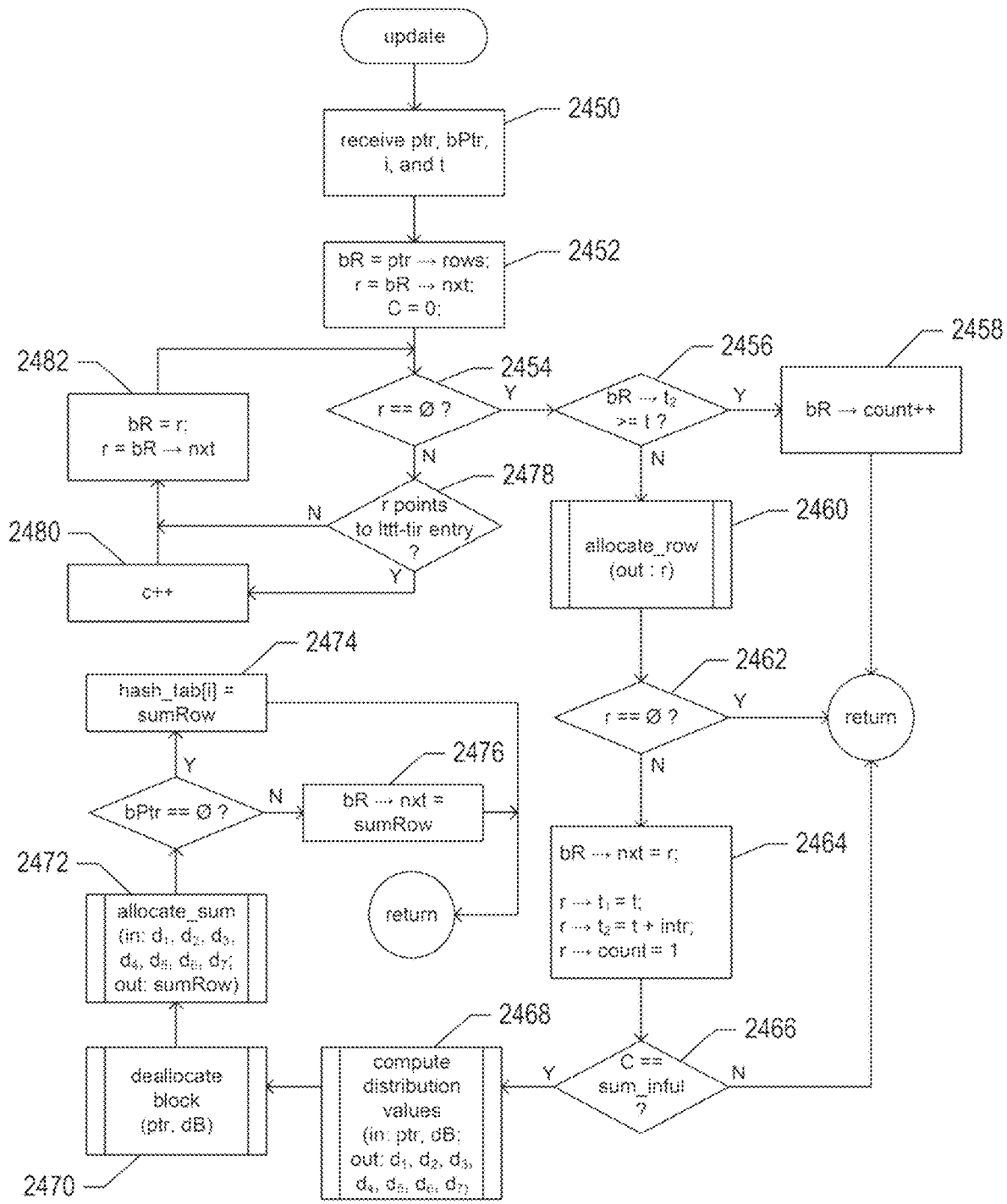
Figure 24D:
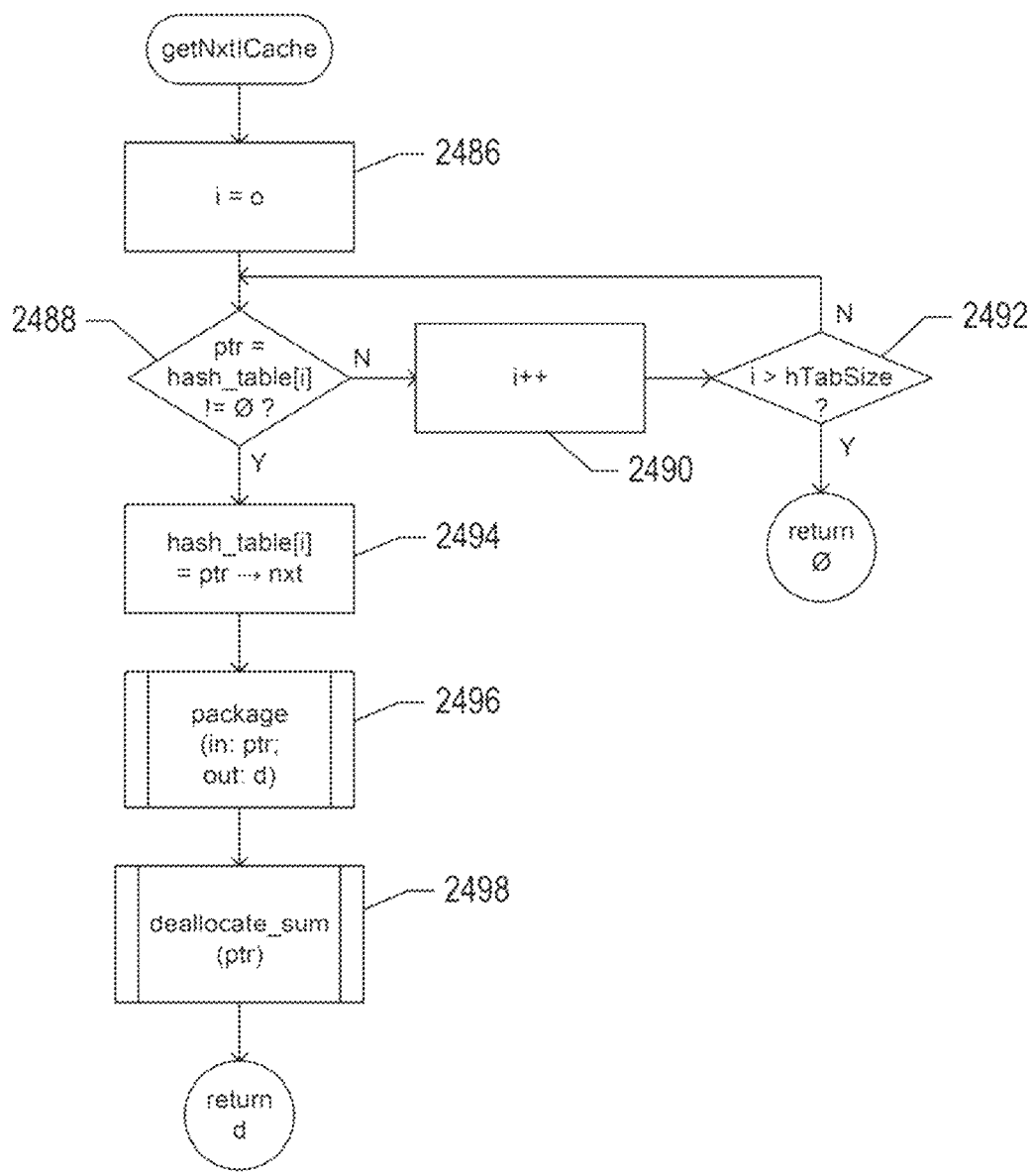

FIG. 24C provides a control-flow diagram for the routine update, called in step 2444 of FIG. 24B. In step 2450, the routine update receives pointer ptr, pointer bPtr, index i, and timestamp t from the calling routine i_cache_write. In step 2452, the routine update sets a pointer bR to the first time-interval-row entry in the list of time-interval-row entries referenced from the BFLM entry pointed to by pointer ptr, sets a pointer r to the time-interval-row entry reference from the first time-interval-row entry, and sets a variable c to 0. When the pointer r is null, as determined in step 2454, and when the second timestamp in the time-interval-row entry pointed to by pointer bR is greater than or equal to timestamp t, as determined in step 2456, the count field in the time-interval-row entry pointed to by pointer bR is incremented, in step 2458. Otherwise, in step 2460, the routine update allocates a new time-interval-row entry. When the allocation fails, as determined in step 2462, the routine update terminates without storing information since the internal-cache memory has been exhausted. Otherwise, in step 2464, the newly allocated time-interval-row entry is initialized and, when the value stored in the local variable c is not equal to the number of log-type-trend-tracker time-interval-row entries that are coalesced to generate a distribution-summary time-interval-row entry, as determined in step 2466, the routine update terminates. Otherwise, in step 2468, the values needed for a replacement distribution-summary time-interval-row entry are computed from the contents of the log-type-trend-tracker-table time-interval-row entries preceding the newly allocated log-type-trend-tracker time-interval-row entry, the log-type-trend-tracker time-interval-row entries preceding the newly allocated log-type-trend-tracker time-interval-row entry are deallocated, in step 2470, and a new distribution-summary time-interval-row entry is allocated and initialized using the computed values in step 2472. The new distribution-summary time-interval-row entry is then either referenced from the hash-table cell indexed by index i, in step 2474, or referenced from a preceding BFLM entry in the list of BFLM entries, and step 2476. Returning to step 2454, when the pointer r is not null, and when the pointer r points to a log-type-trend-tracker-table time-interval-row entry, as determined in step 2478, the local variable c is incremented, in step 2480 and, in step 2482, the pointers bR and r are advanced forward along the list of time-interval-row entries. When the pointer r points to a distribution-summary time-interval-row entry, the local variable c is not incremented.

FIG. 24C provides a control-flow diagram for a routine getNxtICache, which replaces the routine getNxtCache, called in step 1670 of FIG. 16H, in order to incorporate intelligent caching into the message-collector implementation discussed with reference to FIGS. 15-16H. In step 2486, an index i is initialized to 0. When the cell of the hash table indexed by this index contains a null pointer, as determined in step 2488, the index is incremented, in step 2490. When the index has been incremented past the last cell of the hash table, as determined in step 2492, the routine getNxtICache terminates, because there is no more information to extract from intelligent cache. Otherwise, control returns to step 2488. When a cell in the hash table contains a pointer to a BFLM entry, the contents of the cell are updated to contain the contents of the next pointer in the BFLM entry, in step 2494, removing the BFLM entry referenced by the pointer ptr from the BFLM-entry list. The contents of the BFLM entry referenced by the pointer ptr are then packaged into a data item d, in step 2496, and the BFLM entry referenced by the pointer ptr is deallocated, along with the time-interval-row list referenced from the BFLM entry referenced by the pointer ptr, in step 2498. The routine getNxtICache returns the data item d.

Figure 25:
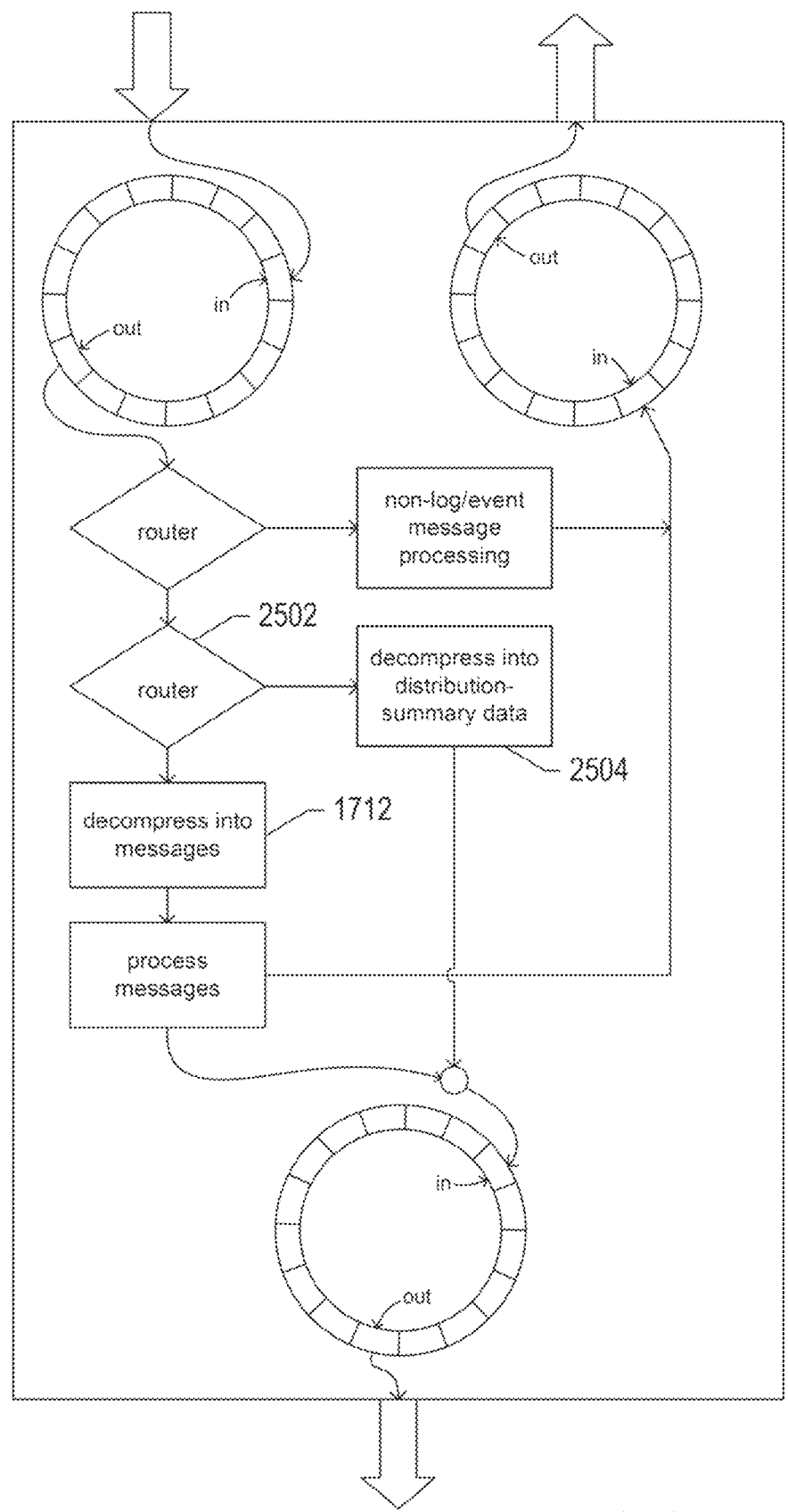
FIG. 25 illustrates a logical implementation of a message-ingestion-and-processing system that incorporates intelligent caching by the message controllers.

FIG. 25 illustrates a logical implementation of a message-ingestion-and-processing system that incorporates intelligent caching by the message controllers. This implementation is very similar to the implementation shown in FIG. 17, with the addition of a second router 2502 that routes packaged summary-distribution information to a decompression subsystem 2504 where the packaged summary-distribution information is decrypted and decompressed into distribution-summary data for transmission to the log/event-message query system. The second router routes compressed processed log/event messages to the message-decompression subsystem 1712, as in FIG. 17.

Figure 26:
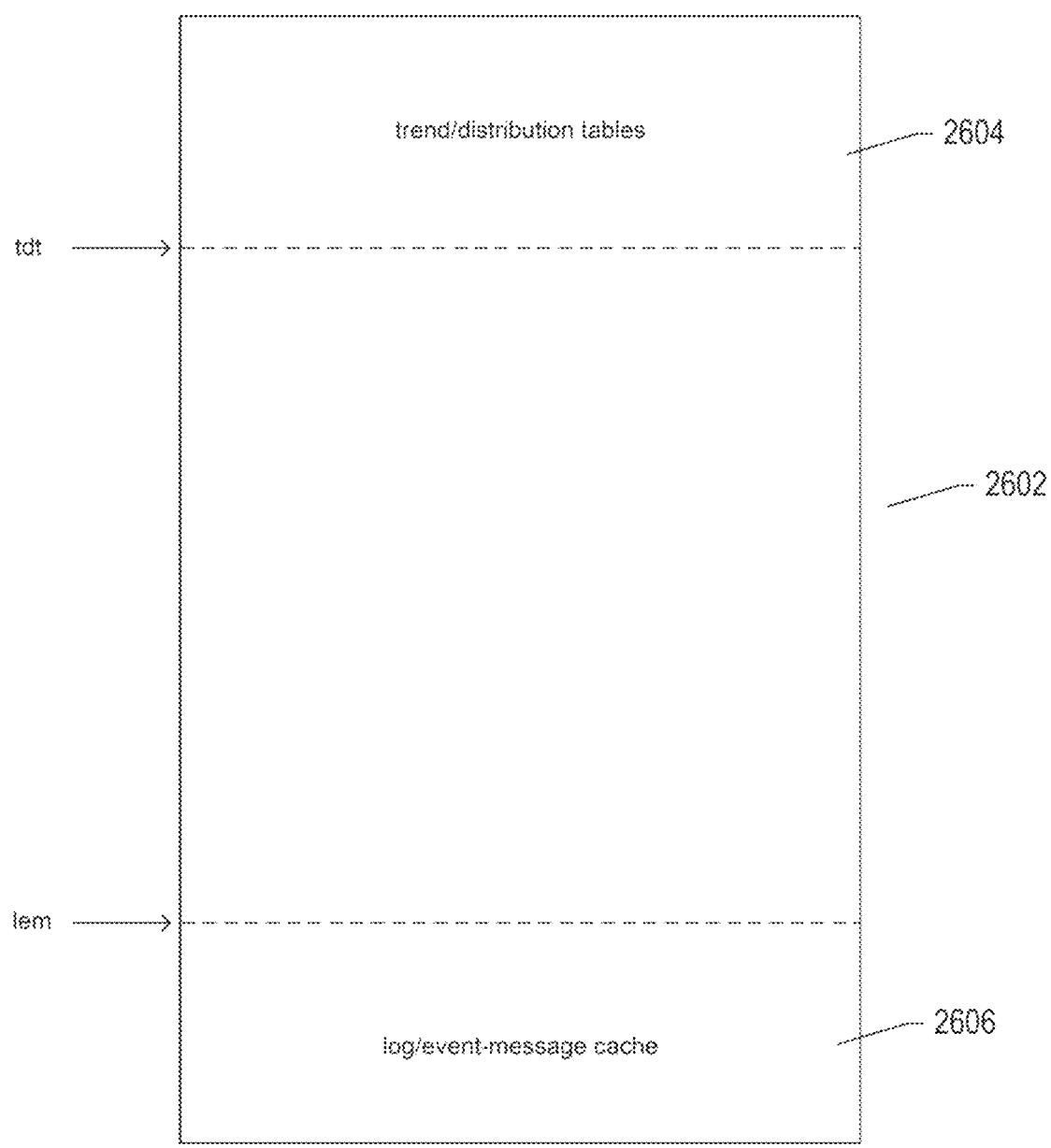
FIG. 26 illustrates an additional feature that may be incorporated into implementations of the currently disclosed efficient, intelligent caching methods and systems.

FIG. 26 illustrates an additional feature that may be incorporated into implementations of the currently disclosed efficient, intelligent caching methods and systems. This additional feature partitions the internal cache memory 2602 into a first portion 2604 that stores the logical log-type-trend-tracker and distribution-summary tables and a second portion 2606 that stores log/event messages. Initially, log/event messages written to the internal cache are both pre-processed, with information corresponding to the log/event messages then entered into the tables in the first portion 2604 of the internal cache, as well as entered into the second portion as they would be in a normal log/event-message caching scheme. As more log/event messages are written to the cache, the first portion grows downward and the second portion grows upward, in the internal cache memory. If caching is discontinued while the two portions have not yet grown into one another, the intact log/event messages stored in the second portion can be extracted and sent to the message-ingestion-and-processing system and the log-type-trend-tracker and distribution-summary tables can be discarded. However, when the two portions grow sufficiently to meet at some point in the middle of the internal-cache memory, caching of every received event/log message is discontinued and the caching reverts to intelligent-caching only, as discussed above. The log-type-trend-tracker and distribution-summary tables can continue to grow into the second portion. When caching is discontinued, after reverting to intelligent caching only, only the distribution-summary information is extracted from the cache, as in the first implementation of intelligent caching, discussed above. Even when intelligent caching is eventually exhausted, selective overwriting of the log-type-trend-tracker and distribution-summary tables can preserve as much useful and current information as possible. This additional feature allows the intelligent cache to avoid any information loss when the caching periods are relatively short and entire log/event messages can be stored. However, once a sufficient number of log/event messages have been written to the intelligent cache, intelligent cache transitions to only storing compressed information in order to achieve highly efficient caching.

Figure 27A:
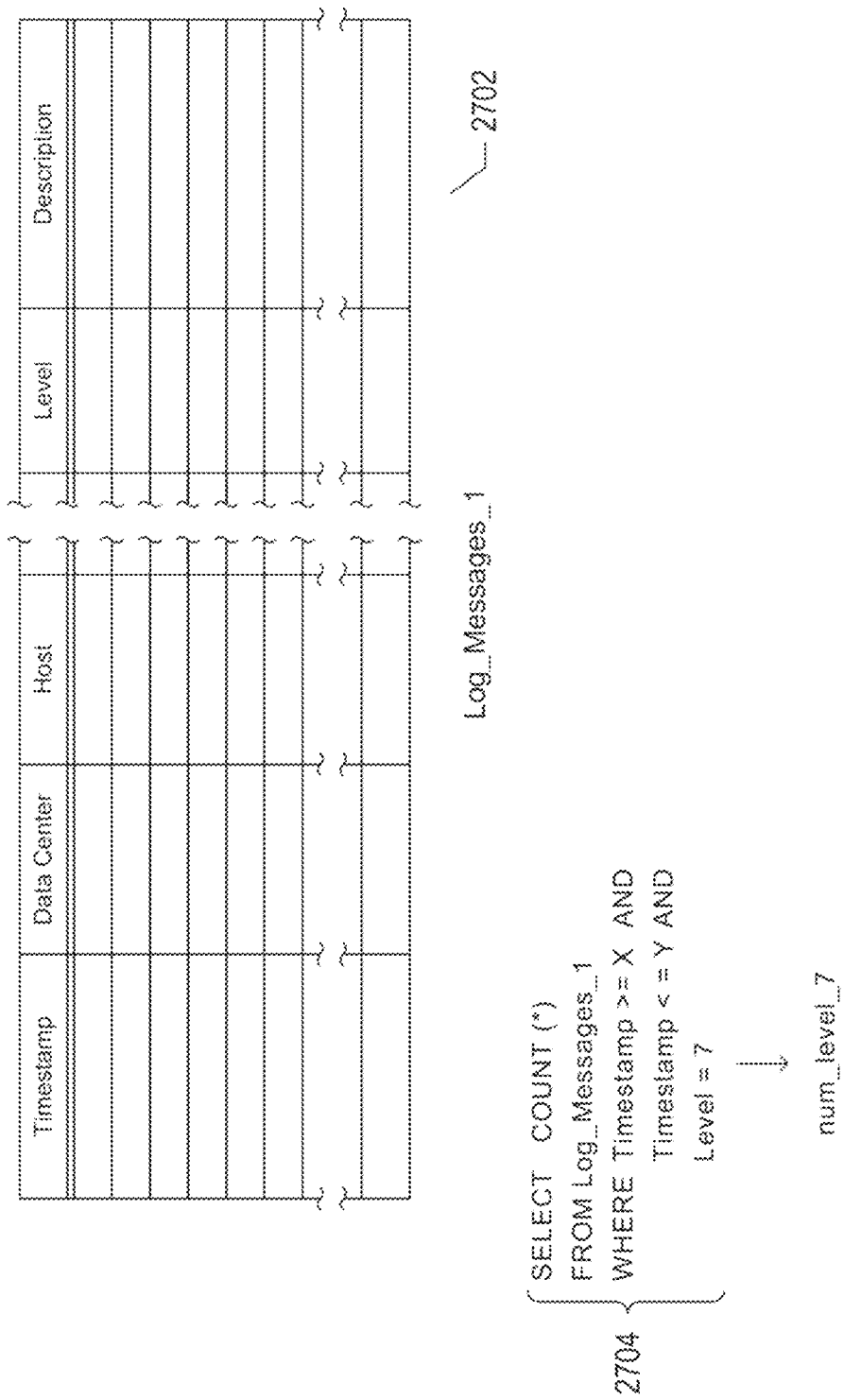

FIGS. 27A-B illustrates execution, by the log/event-message query subsystem, of queries against both stored log/event messages as well as stored distribution-summary information. FIG. 27A shows a relational database table 2702 that stores log/event messages of the type shown in FIG. 20A. In order to determine the number of level-7 log/event messages received during a time period bracketed by timestamps X and Y, the query 2704 can be executed. However, as shown in FIG. 27B, when the time period bracketed by timestamps X and Y includes both stored log/event messages as well as distribution-summary data stored in relational-database table 2706 according to the log/event-message-to-BFLM transformation shown in FIG. 20B, determining the number of level-7 log/event messages received during the time period is a bit more complex. In a first query 2708, the number of log/event messages stored in table 2702, shown in FIG. 27A, corresponding to the new, compressed level 2 which includes the original level 7, is first determined. In a next step 2710, the result returned by query 2704 in FIG. 27A is divided by the result returned from query 2708 to obtain an estimate of the fraction of new level 2 messages that corresponded to the original level 7 messages. Then, query 2712 is executed on the distribution-summary table 2706 to determine the number of new level 2 messages, information for which is included in the distribution-summary table. Finally, the total estimated number of level 7 log/event messages 2714 is obtained by adding the number of level 7 log/event messages stored in table 2702 shown in FIG. 27A to an estimate of the number of original level 7 log/event messages counted in the distribution-summary information stored in table 2706.

The present invention has been described in terms of particular embodiments, it is not intended that the invention be limited to these embodiments. Modifications within the spirit of the invention will be apparent to those skilled in the art. For example, any of many different implementations of the log/event-message system can be obtained by varying various design and implementation parameters, including modular organization, control structures, data structures, hardware, operating system, and virtualization layers, and other such design and implementation parameters. The message database may be implemented using any of a variety of different types of currently available database management systems, including a variety of different types of relational database management systems. Logical implementations for the message collector and message-ingestion-and-processing system are provided in FIGS. 15-17 and 24A-25. There are, of course, a wide variety of different types of real-world implementations corresponding to these logical implementations and, in addition, there are many alternative logical implementations for these log/event-message-system components. As mentioned above, the log-type-trend-tracker table and distribution-summary table may contain different, fewer, and/or additional columns for storing different and additional information in alternative implementations. As also mentioned, many different approaches, from hard coding by developers to automated machine-learning-based methods, can be used to generate patterns and log/event-message-to-B FLM transformations.

What is claimed is:

1. An improved log/event-message system, within a distributed computer system, that collects log/event messages from log/event-message sources within the distributed computer system, stores the collected log/event messages, and provides query-based access to the stored log/event-messages, the log/event-message system comprising: one or more message-ingestion-and-processing systems, incorporated within one or more computer systems, each having one or more processors and one or more memories, which each receives data from one or more message collectors, and stores the received data in a database; and the one or more message collectors, incorporated within one or more computer systems, each having one or more processors and one or more memories, which each receives log/event messages from the log/event-message sources, when log/event messages can be forwarded by the message collector to one or more message-ingestion-and-processing systems, forwards the log/event messages to one or more of one or more message-ingestion-and-processing systems; and when log/event messages cannot be forwarded by the message collector to one or more message-ingestion-and-processing systems, transforms the log/event messages into base-form-log-messages ("BFLMs"), and compiles and stores, from the BFLMs, compressed information for subsequent transmission to one or more of one or more message-ingestion-and-processing systems.

2. The log/event-message system of claim 1 wherein log/event-message sources include: message-generation-and-reporting components of hardware components of the distributed computer system, including network routers and bridges, network-attached storage devices, network-interface controllers, and other hardware components and devices; and message-generation-and-reporting components within computer-instruction-implemented components of the distributed computer system, including virtualization layers, operating systems, and applications running within servers and other types of computer systems.

3. The log/event-message system of claim 1 wherein log/event-messages include text, alphanumeric values, and/or numeric values that represent various types of information, including notification of completed actions, errors, anomalous operating behaviors and conditions, various types of computational events, warnings, and other such information.

4. The log/event-message system of claim 1 wherein the message collector transforms a log/event message into a BFLM by: parsing each log/event message to extract one or more fields; and using the one or more fields to generate the BFLM.

5. The log/event-message system of claim 1 wherein the message collector uses the one or more extracted fields to generate the BFLM by: for each of the extracted fields, incorporating the field in the BFLM, truncating the field and incorporating the truncated field in the BFLM, abbreviating the field and incorporating the abbreviated field in the BFLM, compressing the field and incorporating the compressed field into the BFLM, mapping the field to one of a set of replacement fields and incorporating the replacement field into the BFLM, and omitting the field from the BFLM.

6. The log/event-message system of claim 1 wherein the ratio of unique BFLMs to unique log/event messages is less than one of 0.001 and 0.000001.

7. The log/event-message system of claim 1 wherein the message collector transforms log/event messages into BFLMs in order to minimize the number of unique BFLMs, to achieve as great a compression as possible, as well as to minimize the information loss suffered when log/event messages cannot be forwarded by the message collector to one or more message-ingestion-and-processing systems but are instead transformed into BFLMs and used to generate compressed information for subsequent transmission to one or more of one or more message-ingestion-and-processing systems.

8. The log/event-message system of claim 1 wherein the message collector compiles and stores compressed information for subsequent transmission to one or more of one or more message-ingestion-and-processing systems by:for each BFLM generated from a received log/event message, storing, in a logical log-type-trend-tracker table, a count of the number of received log/event messages from which the BFLM is generated during each short time interval in a logical log-type-trend-tracker table entry corresponding to the BFLM; and continuously coalescing sets of successive log-type-trend-tracker-table short time intervals to generate statistics for distribution-summary longtime intervals and adding the long time intervals to entries in a distribution-summary table.

9. The log/event-message system of claim 8 wherein the logical log-type-trend-tracker table includes an entry for each BFLM generated from a log/event message received during a caching period, the entry including the BFLM and one or more counts for one or more short time intervals.

10. The log/event-message system of claim 8 wherein the logical distribution-summary table includes an entry for each BFLM generated from a log/event message received during a caching period, the entry including the BFLM and statistics computed for each of one or more longtime intervals.

11. The log/event-message system of claim 1 the logical log-type-trend-tracker-table and the logical distribution-summary table are implemented as a hash table, each cell of which contains either a null pointer or a pointer to a list of one or more BFLM entries, each BFLM entry including a pointer to a list of one or more time-interval entries.

12. A method that compresses accumulated log/event messages within a message collector of a log/event-message system, within a distributed computer system, that collects log/event messages from log/event-message sources within the distributed computer system, stores the collected log/event messages, and provides query-based access to the stored log/event-messages, the method comprising: when log/event messages cannot be forwarded by the message collector to one or more message-ingestion-and-processing systems, transforming the log/event messages into base-form-log-messages ("BFLMs"), and compiling and storing, using the BFLMs, compressed information for subsequent transmission to one or more of one or more message-ingestion-and-processing systems.

13. The method of claim 12 wherein log/event-messages include text, alphanumeric values, and/or numeric values that represent various types of information, including notification of completed actions, errors, anomalous operating behaviors and conditions, various types of computational events, warnings, and other such information.

14. The method of claim 12 wherein transforming a log/event message into a BFLM further comprises: parsing each log/event message to extract one or more fields; and using the one or more fields to generate the BFLM.

15. The method of claim 12 wherein using the one or more fields to generate the BFLM further comprises: for each of the extracted fields, incorporating the field in the BFLM, truncating the field and incorporating the truncated field in the BFLM, abbreviating the field and incorporating the abbreviated field in the BFLM, compressing the field and incorporating the compressed field into the BFLM, mapping the field to one of a set of replacement fields and incorporating the replacement field into the BFLM, and omitting the field from the BFLM.

16. The method of claim 12 wherein the ratio of unique BFLMs to unique log/event messages is less than one of 0.001 and 0.000001.

17. The method of claim 12 wherein log/event messages are transformed into BFLMs in order to minimize the number of unique BFLMs, to achieve as great a compression as possible, as well as to minimize the information loss suffered when log/event messages cannot be forwarded by the message collector to one or more message-ingestion-and-processing systems but are instead transformed into BFLMs and used to generate compressed information for subsequent transmission to one or more of one or more message-ingestion-and-processing systems.

18. The method of claim 12 wherein compiling and storing, using the BFLMs, compressed information for subsequent transmission to one or more of one or more message-ingestion-and-processing systems further comprises: for each BFLM generated from a received log/event message, storing, in a logical log-type-trend-tracker table, a count of the number of received log/event messages from which the BFLM is generated during each short time interval in a logical log-type-trend-tracker table entry corresponding to the BFLM; and continuously coalescing sets of successive log-type-trend-tracker-table short time intervals to generate statistics for distribution-summary longtime intervals and adding the long time intervals to entries in a distribution-summary table.

19. The method of claim 18 wherein the logical log-type-trend-tracker table includes an entry for each BFLM generated from a log/event message received during a caching period, the entry including the BFLM and one or more counts for one or more short time intervals; and wherein the logical distribution-summary table includes an entry for each BFLM generated from a log/event message received during a caching period, the entry including the BFLM and statistics computed for each of one or more longtime intervals.

20. A physical data-storage device that stores computer instructions that, when executed by processors within a computer system of a log/event-message system within a distributed computer system, control a message collector implemented in the computer system to: when log/event messages cannot be forwarded by the message collector to one or more message-ingestion-and-processing systems, transform the log/event messages into base-form-log-messages ("BFLMs"), and compile and store, using the BFLMs, compressed information for subsequent transmission to one or more of one or more message-ingestion-and-processing systems.

\* \* \* \* \*